US012726445B2

(12) United States Patent
Kassir et al.

(10) Patent No.: US 12,726,445 B2
(45) Date of Patent: Sep. 1, 2026

(54) DEVICE ASSISTED CONGESTION CONTROL

(71) Applicant: QUALCOMM Incorporated, San Diego, CA (US)

(72) Inventors: Saadallah Kassir, San Diego, CA (US); Ravi Agarwal, San Diego, CA (US); Prashanth Haridas Hande, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 19/003,265

(22) Filed: Dec. 27, 2024

(65) Prior Publication Data

US 2026/0121995 A1 Apr. 30, 2026

Related U.S. Application Data

(60) Provisional application No. 63/658,839, filed on Jun. 11, 2024.

(51) Int. Cl.
*H04L 47/33* (2022.01)

(52) U.S. Cl.
CPC .................................... *H04L 47/33* (2013.01)

(58) Field of Classification Search
CPC ....................................................... H04L 47/33
See application file for complete search history.

(56) References Cited

U.S. PATENT DOCUMENTS

2012/0147750 A1* 6/2012 Pelletier .................. H04W 8/04 370/235
2013/0155938 A1* 6/2013 Smith ................... H04L 1/1848 370/315
2013/0194937 A1* 8/2013 Sridhar ................. H04L 47/245 370/252
2018/0091999 A1* 3/2018 Zhang ............... H04W 28/0289
2018/0242191 A1* 8/2018 Lundqvist ............. H04W 72/54
2020/0322837 A1* 10/2020 Mihály ............. H04W 28/0284

OTHER PUBLICATIONS

K. Ramakrishnan et al., "The Addition of Explicit Congestion Notification (ECN) to IP", The Internet Society, pp. 1-63 (Year: 2001).*

* cited by examiner

*Primary Examiner* — Clayton R Williams
(74) *Attorney, Agent, or Firm* — QUALCOMM Incorporated

(57) ABSTRACT

Methods, systems, and devices for wireless communications are described. In some examples, a user equipment (UE) may transmit a capability message indicating that the UE can perform a modification procedure on one or more explicit congestion notification (ECN) fields and may receive a configuration message instructing the UE to perform the modification procedure. Thus, when the UE receives data packets that include ECN fields, the UE may modify the ECN field of a first data packet based on receiving the configuration message. In some other examples, the UE may receive the data packets at a modem of the UE via a wireless channel. The UE may then send congestion information associated with the wireless channel from the modem of the UE to a congestion controller of the UE. Using the congestion information the UE may then send a feedback message that is associated with the received data packets.

20 Claims, 15 Drawing Sheets

500

600

DEVICE ASSISTED CONGESTION CONTROL

CROSS REFERENCE

The present Application for Patent claims priority to U.S. Provisional Patent Application No. 63/658,839 by Kassir et al., entitled "DEVICE ASSISTED CONGESTION CONTROL," filed Jun. 11, 2024, which is assigned to the assignee hereof, and each of which is expressly incorporated by reference in its entirety herein

FIELD OF TECHNOLOGY

The following relates to wireless communications, including device assisted congestion control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include transmitting a capability message indicating that the UE is capable of performing an explicit congestion notification (ECN) field modification procedure on a data packet, receiving a configuration message instructing the UE to perform the ECN field modification procedure based on the capability message, receiving, via a first wireless channel, one or more data packets, where the one or more data packets include respective ECN fields in respective header portions of the one or more data packets, and modifying an ECN field of a first data packet of the one or more data packets based on receiving the configuration message.

A UE for wireless communications is described. The UE may include one or more memories storing processor executable code, and one or more processors coupled with the one or more memories. The one or more processors may individually or collectively be operable to execute the code to cause the UE to transmit a capability message indicating that the UE is capable of performing an ECN field modification procedure on a data packet, receive a configuration message instructing the UE to perform the ECN field modification procedure based on the capability message, receive, via a first wireless channel, one or more data packets, where the one or more data packets include respective ECN fields in respective header portions of the one or more data packets, and modify an ECN field of a first data packet of the one or more data packets based on receiving the configuration message.

Another UE for wireless communications is described. The UE may include means for transmitting a capability message indicating that the UE is capable of performing an ECN field modification procedure on a data packet, means for receiving a configuration message instructing the UE to perform the ECN field modification procedure based on the capability message, means for receiving, via a first wireless channel, one or more data packets, where the one or more data packets include respective ECN fields in respective header portions of the one or more data packets, and means for modifying an ECN field of a first data packet of the one or more data packets based on receiving the configuration message.

A non-transitory computer-readable medium storing code for wireless communications is described. The code may include instructions executable by one or more processors to transmit a capability message indicating that the UE is capable of performing an ECN field modification procedure on a data packet, receive a configuration message instructing the UE to perform the ECN field modification procedure based on the capability message, receive, via a first wireless channel, one or more data packets, where the one or more data packets include respective ECN fields in respective header portions of the one or more data packets, and modify an ECN field of a first data packet of the one or more data packets based on receiving the configuration message.

Some examples of the method, UEs, and non-transitory computer-readable medium described herein may further include operations, features, means, or instructions for transmitting, based on receiving the one or more data packets, a feedback message including an ECN marking report, the ECN marking report indicating a first quantity of data packets of the one or more data packets that include a marked ECN field and indicating a second quantity of data packets from the one or more data packets that include an unmarked ECN field.

In some examples of the method, UEs, and non-transitory computer-readable medium described herein, the first quantity of data packets and the second quantity of data packets indicated via the ECN marking report may be based on the ECN field of the first data packet being modified via the ECN field modification procedure.

In some examples of the method, UEs, and non-transitory computer-readable medium described herein, modifying the ECN field of the first data packet may include operations, features, means, or instructions for modifying the ECN field of the first data packet to add a marking of congestion to the ECN field.

In some examples of the method, UEs, and non-transitory computer-readable medium described herein, modifying the ECN field of the first data packet may include operations, features, means, or instructions for modifying the ECN field of the first data packet to remove a marking of congestion to the ECN field.

Some examples of the method, UEs, and non-transitory computer-readable medium described herein may further include operations, features, means, or instructions for sending the one or more data packets from a modem of the UE to a congestion controller of the UE, where the ECN field of the first data packet may be modified at the modem of the UE.

In some examples of the method, UEs, and non-transitory computer-readable medium described herein, the ECN field of the first data packet may be modified via the ECN field modification procedure based on congestion information associated with the first wireless channel.

In some examples of the method, UEs, and non-transitory computer-readable medium described herein, the congestion information includes an indication of a throughput level, an indication of a transfer time associated with the one or more data packets, an indication of a hybrid automatic repeat request (HARQ) pattern, one or more link capacity measurements associated with the first wireless channel, one or more signal to noise ratio (SNR) measurements associated with the first wireless channel, or any combination thereof.

A method for wireless communications by a UE is described. The method may include receiving, at a modem of the UE via a first wireless channel, one or more data packets, where the one or more data packets include respective ECN fields in respective header portions of the one or more data packets, sending, from the modem of the UE to a congestion controller of the UE, congestion information associated with the one or more data packets received via the first wireless channel, and transmitting a feedback message associated with the one or more data packets, the feedback message being based on the congestion information received at the congestion controller of the UE from the modem of the UE.

A UE for wireless communications is described. The UE may include one or more memories storing processor executable code, and one or more processors coupled with the one or more memories. The one or more processors may individually or collectively be operable to execute the code to cause the UE to receive, at a modem of the UE via a first wireless channel, one or more data packets, where the one or more data packets include respective ECN fields in respective header portions of the one or more data packets, send, from the modem of the UE to a congestion controller of the UE, congestion information associated with the one or more data packets received via the first wireless channel, and transmit a feedback message associated with the one or more data packets, the feedback message being based on the congestion information received at the congestion controller of the UE from the modem of the UE.

Another UE for wireless communications is described. The UE may include means for receiving, at a modem of the UE via a first wireless channel, one or more data packets, where the one or more data packets include respective ECN fields in respective header portions of the one or more data packets, means for sending, from the modem of the UE to a congestion controller of the UE, congestion information associated with the one or more data packets received via the first wireless channel, and means for transmitting a feedback message associated with the one or more data packets, the feedback message being based on the congestion information received at the congestion controller of the UE from the modem of the UE.

A non-transitory computer-readable medium storing code for wireless communications is described. The code may include instructions executable by one or more processors to receive, at a modem of the UE via a first wireless channel, one or more data packets, where the one or more data packets include respective ECN fields in respective header portions of the one or more data packets, send, from the modem of the UE to a congestion controller of the UE, congestion information associated with the one or more data packets received via the first wireless channel, and transmit a feedback message associated with the one or more data packets, the feedback message being based on the congestion information received at the congestion controller of the UE from the modem of the UE.

Some examples of the method, UEs, and non-transitory computer-readable medium described herein may further include operations, features, means, or instructions for performing, at the congestion controller of the UE, a packet counting procedure to detect a first quantity of data packets of the one or more data packets that include a marked ECN field and a second quantity of data packets from the one or more data packets that include an unmarked ECN field, where the first quantity of data packets, the second quantity of data packets, or both may be modified based on the congestion information and transmitting, via the feedback message, am ECN field marking report including the first quantity of data packets and the second quantity of data packets based on performing the packet counting procedure.

Some examples of the method, UEs, and non-transitory computer-readable medium described herein may further include operations, features, means, or instructions for establishing an application programming interface (API) between with the modem of the UE and the congestion controller, where the UE sends the congestion information from the modem of the UE to the congestion controller of the UE via the API.

In some examples of the method, UEs, and non-transitory computer-readable medium described herein, transmitting the feedback message may include operations, features, means, or instructions for transmitting, via the feedback message, an indication of a target bitrate for subsequent communications, the target bitrate being based on the congestion information.

In some examples of the method, UEs, and non-transitory computer-readable medium described herein, transmitting the feedback message may include operations, features, means, or instructions for transmitting, via the feedback message, an indication of a target congestion window for subsequent communications, the target congestion window being based on the congestion information, where the target congestion window may be transmitted based on a type of transport protocol used by the UE.

In some examples of the method, UEs, and non-transitory computer-readable medium described herein, transmitting the feedback message may include operations, features, means, or instructions for transmitting, via the feedback message, both an ECN field marking report and the congestion information associated with the one or more data packets, the ECN field marking report indicating a first quantity of data packets of the one or more data packets that include a marked ECN field and a second quantity of data packets from the one or more data packets that include an unmarked ECN field.

In some examples of the method, UEs, and non-transitory computer-readable medium described herein, transmitting the congestion information via the feedback message may include operations, features, means, or instructions for transmitting the congestion information within an options field of a header of the feedback message based on a type of transport protocol being used by the UE.

In some examples of the method, UEs, and non-transitory computer-readable medium described herein, the congestion information includes an indication of a transfer time associated with the one or more data packets, an indication of a HARQ pattern, one or more link capacity measurements associated with the first wireless channel, one or more SNR measurements associated with the first wireless channel, or any combination thereof.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
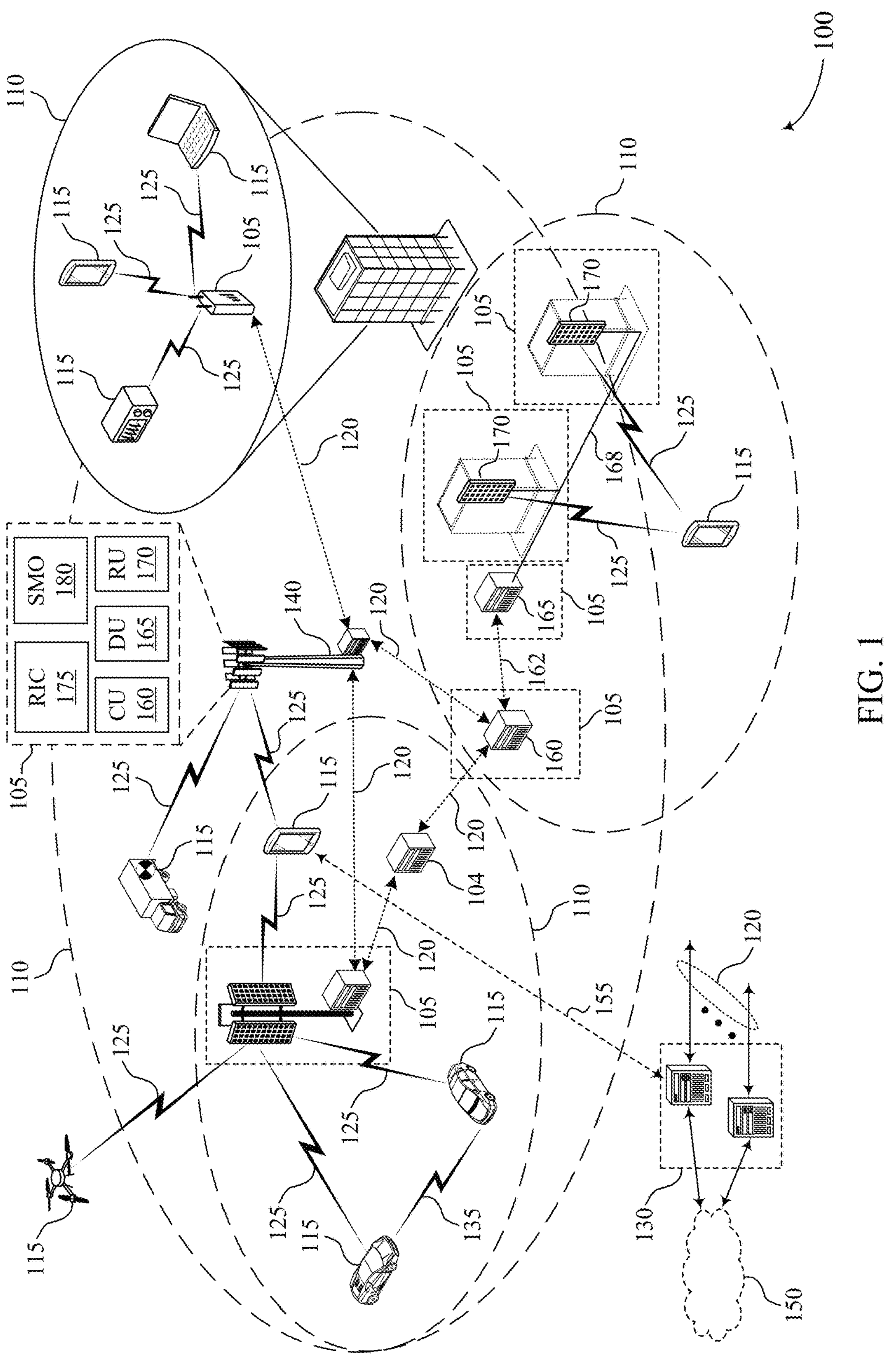
FIGS. 1 and 2 show examples of a wireless communications system that supports device assisted congestion control in accordance with one or more aspects of the present disclosure.

In some examples, a wireless communication system may support one or more extended reality (XR) devices (e.g., user equipments (UEs)) which may have relatively stringent quality of service (QoS) requirements for communications. XR devices may include virtual reality (VR) devices, augmented reality (AR) devices, mixed reality (MR) devices, or any combination thereof. To support communications between XR devices a wireless communications system may be expected to maintain relatively low latency, high reliability, high bandwidth, and low device power consumption. In some cases, to support XR devices, a wireless communications system may enable rate adaptations to ensure minimal end-to-end (E2E) delay and to minimize the impact of network congestion. For example, a wireless communication system may implement low latency, low loss, and scalable throughout (L4S) techniques via a network-assisted congestion control framework to perform rate adaptations. The L4S framework may include a network entity utilizing an explicit congestion notification (ECN) field of an internet protocol (IP) header for a data packet to indicate congestion at the network.

Congestion at a network entity may be based on the network entity having a relatively large quantity of data packets waiting within transmission queues. Therefore, when an L4S capable node (e.g., a network entity or a radio access network (RAN) node) is experiencing congestion, the L4S node may set the ECN field to a respective value indicating that the network is experiencing congestion (e.g., a congestion experienced (CE) value of the ECN field). In some examples, data packets indicated with a CE value within the ECN field may be considered a "marked" data packet. Using the ECN fields, to determine a level of congestion at the network entity the UE may count a quantity of marked and unmarked data packets from a set of received data packets. If the UE counts a relatively high quantity or level of marked data packets, the UE may determine that the network entity is experiencing a relatively high level of congestion. Moreover, if the UE counts a relatively low quantity or level of marked data packets, the UE may determine that the network entity is experiencing a relatively low level of congestion.

When indicating the level of congestion at the network a network entity may mark the ECN fields of data packets when the data packets enter a queue. Further, due to the network entity marking the most recent data packets, the UE may be unable to determine an accurate level of congestion at the network entity. For example, the UE may be unable to determine whether a current level of congestion at the network entity has changed until the UE receives the data packets that most recently entered a transmission queue. Thus, there may be some latency between when the network entity indicates a level of congestion via the ECN fields of data packets and when the UE detects the indicated level of congestion at the network entity. As a result, having the UE determine a level of congestion at the network entity by counting a quantity of marked and unmarked data packets may be relatively inefficient and may increase the latency of communications. Further, inaccurate, and inefficient congestion level indications may impact the ability of the wireless communications system to support XR communications.

To increase the efficiency of network congestion detection and to decrease the latency of communications to better support XR device communicates, the techniques of the present disclosure may describe a UE utilizing congestion information associated with a wireless channel (e.g., a wireless channel between the UE and a network entity). For example, the UE may obtain congestion information and utilize the congestion information to provide the network entity with additional information for congestion control determinations that are relatively more real-time than the information available at the network entity. In some examples, in accordance with the techniques of the present disclosure, a UE may use a modem of the UE to perform a modification procedure on the ECN fields of received data packets to aid the network entity. For example, based on the UE transmitting a capability message and receiving a configuration message, the UE may mark additional ECN field or remove ECN field markings. Therefore, when a congestion controller of the UE counts the marked and unmarked data packets, the congestion controller may indicate different quantities than initially indicated by the network entity.

Thus, the congestion controller of the UE may be capable of indicating a higher or lower level of congestion at the network entity based on the modem of the UE utilizing relatively more real-time congestion information to perform a modification procedure on the ECN fields of the received data packets.

In some other examples, the modem of a UE may indicate the congestion information to the congestion controller of the UE via an application programming interface (API) between the modem and the congestion controller. In some cases, the congestion controller may use the congestion information to indicate, to the network entity via a feedback message, a higher or lower level of congestion by indicating a relatively higher or lower quantity of marked packets. In some other cases, the congestion controller may use the congestion information to indicate a target bit rate for subsequent (e.g., future) communications via the feedback message. Additionally, or alternatively, the congestion controller may indicate the congestion information to the network entity via a feedback message that also indicates an indication of a quantity of marked and unmarked packets. Thus, the techniques of the present disclosure may enable the UE to utilize the congestion information to enhance the ability of the wireless communications system to support XR communications resulting in a more efficient and reliable wireless communication system.

Aspects of the disclosure are initially described in the context of wireless communications systems. Additional aspects of the disclosure are described with reference to wireless communications systems and process flows. Aspects of the disclosure are further illustrated by and described with reference to apparatus diagrams, system diagrams, and flowcharts that relate to device assisted congestion control.

FIG. 1 shows an example of a wireless communications system 100 that supports device assisted congestion control in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

To better support XR device communications, the techniques of the present disclosure may describe a UE 115 utilizing congestion information associated with a wireless channel that is used by the UE 115 to receive data packets to increase the efficiency of network congestion detection and to decrease the latency of communications. For example, the UE 115 may detect (e.g., measure, identify, determine, or any combination thereof) congestion information associated with the wireless channel between the UE 115 and a network entity 105 that the UE 115 receives one or more data packets on. Therefore, the UE 115 may be capable of utilizing relatively more real-time information to perform congestion control along with additional information that is unavailable at a network entity 105.

In some examples, in accordance with the techniques of the present disclosure, a UE 115 may indicate, to a network entity 105 via a capability message, that the UE 115 is capable of marking or removing marking from ECN fields of packets at a modem of the UE 115 based on congestion information measured or identified by the UE 115. For example, a modem of the UE 115 may detect (e.g., measure or identify) congestion information associated with a wireless channel that the UE 115 receives data packets on. Using the congestion information, the UE 115 may be capable of detecting if the network entity 105 is experiencing a higher level of congestion or a lower level of congestion than the level of congestion indicated by the network entity 105 via the marking of the ECN fields of data packets that the UE 115 receives. Further, a modem of the UE 115 may use the congestion information to modify the ECN fields of the received data packets before forwarding the data packets to a congestion controller of the UE 115. Therefore, when the congestion controller of the UE 115 receives the data packets from the modem of the UE and counts the quantity of marked and unmarked data packets, the congestion controller may count a relatively higher or lower quantity of marked or unmarked data packets. Thus, the UE 115 may utilize the congestion information to perform ECN field modifications to provide a relatively more accurate congestion indication.

In some other examples, the modem of a UE 115 may indicate the congestion information to the congestion controller of the UE 115 via an API between the modem and the congestion controller. In some cases, the congestion controller may use the congestion information to indicate, to the network entity 105 via a feedback message, a relatively higher or lower level of congestion by indicating a relatively higher or lower quantity of marked packets. In some other cases, the congestion controller may use the congestion information to indicate a target bit rate for future communications via the feedback message. Additionally, or alternatively, the congestion controller may indicate the congestion information to the network entity 105 via a feedback message that also indicates an indication of a quantity of marked and unmarked packets. Thus, the techniques of the present disclosure may enable the UE 115 to utilize the congestion information to enhance the ability of the wireless communications system 100 to support XR communications resulting in a more efficient and reliable wireless communications.

Figure 2:
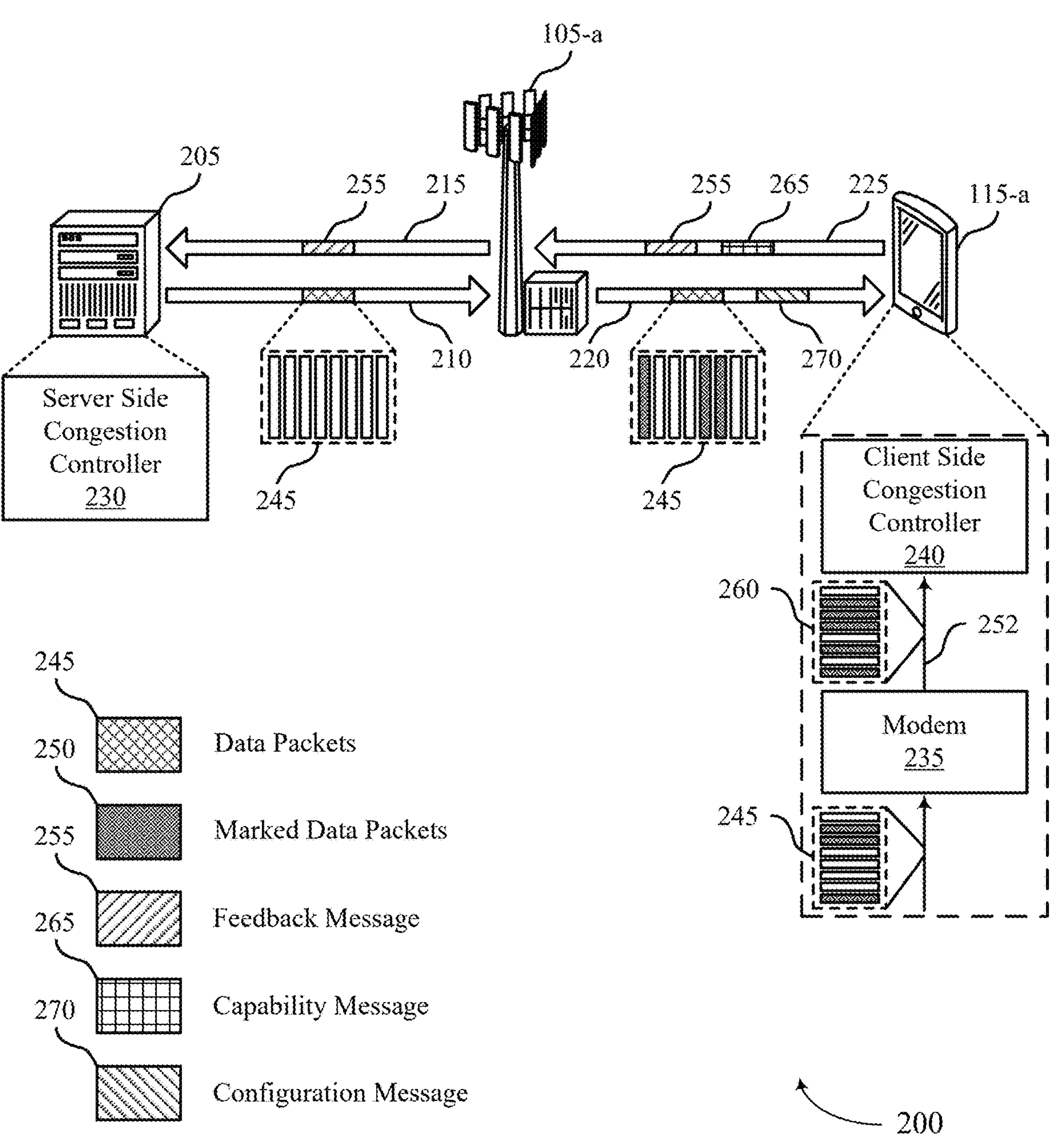

FIG. 2 shows an example of a wireless communications system 200 that supports device assisted congestion control in accordance with one or more aspects of the present disclosure. In some examples, the wireless communications system 200 may implement or be implemented by the wireless communications system 100. For example, the wireless communications system 200 may include a network entity 105-*a*, an application server 205, and a UE 115-*a*, which may be examples of devices described herein with reference to FIG. 1. In some examples, the application server 205 may communicate with the network entity 105-*a* via a communication link 210 and the network entity 105-*a* may communicate with the application server via a communication link 215. Further, the network entity 105-*a* may communicate with the UE 115-*a* via a communication link 220 and the UE 115-*a* may communicate with the network entity 105-*a* via a communication link 225. In some examples, the communication link 210 and the communication link 220 may be referred to as downlink communication links and the communication link 215 and the communication link 225 may be referred to as uplink communication links. Further, the communication link 210 and the communication link 215 may be examples of a Uu link, a sidelink, a backhaul link, a D2D link or some other type of communication link 125 described herein with reference to FIG. 1. Moreover, the communication link 220 and the communication link 225 may be examples of a sidelink communication link, a D2D link, or any other type of communication link 125 described herein with reference to FIG. 1. Further, the application server 205 may include a server side congestion controller 230 and the UE 115-*a* may include a modem 235 and a client side congestion controller 240.

In some examples of the wireless communications system 200, the UE 115-*a* may be an example of an XR device that is associated with relatively stringent QoS requirements. For example, the UE 115-*a* may expect that the network entity 105-*a* can support low latency, high reliability, and high bandwidth communications along with relatively low levels of device power consumption at the UE 115-*a*. Some examples of XR communications may be the application server 205 and the network entity 105-*a* transmitting video frames and video data to the UE 115-*a*. In such examples, to ensure relatively minimal end-to-end delay, the application server 205 may implement video rate adaptation mechanisms to adjust video encoding bitrates to minimize network congestion. In some cases, network congestion control mechanisms may be implemented via over-the-top (OTT) algorithms where a rate adaptation client (e.g., the UE 115-*a*) may provide congestion information or measurements (e.g., round-trip-time (RTT) measurements) as feedback to the application server 205 (e.g., via a real-time control protocol (RTCP)). The application server 205 may further use the congestion information to adjust the encoding rate accordingly. In some other cases, the network entity 105-*a* may implement network-assisted algorithms to provide the UE 115-*a* with a congestion indication when the network entity 105-*a* experiences congestion. For example, the network entity 105—may use an ECN field of an IP header of one or more data packet 245 (e.g., IP packets) to indicate a level of congestion. Further, a rate adaptation client (e.g., the UE 115-*a*) may then use the information from the ECN fields of the header of the data packets 245 to detect the level of congestion and inform the application server 205. Such use of the ECN field may be an example of L4S that is an example of a network-assisted congestion control framework that leverages the ECN field in the IP header of a respective data packet 245 to provide congestion information to an application-layer congestion control algorithm (e.g., the client side congestion controller 240).

In some examples, the architecture of the L4S framework architecture may include three components. A first component of the L4S framework architecture may include end-to-end rate adaptation algorithms (e.g., transport control protocol (TCP) or application-layer algorithms on top of a real-time transport protocol (RTP), a user datagram protocol (UDP), or a combination thereof). Further, the L4S framework architecture may include active queue management (AQM) at the network node (e.g., the network entity 105-*a*). AQM may be a mechanism of assigning data packets 245 to different priority queues to reduce network congestion. Additionally, or alternatively, the L4S framework architecture may also include a protocol between the network entity 105-*a* and the UE 115-*a* that enables the network entity 105-*a* to mark the ECN fields in the IP header of a respective data packet to provide congestion information exposure.

The ECN field of the IP header may be a two-bit field that is used by an LAS capable node (e.g., the network entity 105-*a*) to indicate congestion at the node. For example, the network entity 105-*a* may set the ECN field of a data packet 245 to a CE value (e.g., a value of 11) as an early congestion indicator that indicates the function of the state of the queue that the data packet 245 is within. Further indications of the ECN field may be shown below via Table 1. For example, the ECN field may indicate whether the data packet is able to support ECN capable transport (ECT), a type of ECT, whether the network is experiencing congestion, or any combination thereof.

TABLE 1

| Mark | Codepoint | Description |
|---|---|---|
| 00 | Not-ECT | Not ECN capable transport |
| 01 | ECT (0) | ECN capable (e.g., DCTCP) |
| 10 | ECT (1) | L4S capable (e.g., TCP Prague) |
| 11 | CE | Congestion Experienced (marked packet) |

In some examples, a receiver (e.g., the UE 115-*a*) may read the ECN field based on receiving a data packet 245 and report back to the application server 205 in a TCP ACK header or via RTCP when RTP is being used on top of UDP. Moreover, when an ECN field indicated that the network entity 105-*a* is experiencing congestion (e.g., via a CE indication) the respective data packet 245 may be considered a marked data packet 250. In some cases, ECN marking policies may be vendor-specific, however the marking probability may be expected to be a function of the LAS queue size and the standard (e.g., classic) queue size, queueing delays, a channel quality indicator (CQI), or any combination thereof. Moreover, in some examples, the probability of a respective data packet being marked may be based on one or more queuing delay (e.g., in seconds) thresholds (e.g., a minimum queuing delay threshold or a maximum queuing delay threshold). For example, if a queuing delay satisfies the minimum queuing delay threshold the probability of a data packet 245 may be zero and if the queueing delay satisfies the maximum queuing delay threshold the probability of a data packet 245 may be one. Therefore, the network entity 105-*a* may mark the ECN field of each data packet 245 that enters a queue when the maximum queuing delay threshold is satisfied.

Further, when a data packet 245 from the application server 205 enters a queue at the network entity 105-*a*, the network entity 105-*a* may observe the current queueing delay to determine whether to mark a respective data packet. However, in some cases, since the network entity 105-*a* marks the data packets 245 as the data packets 245 enter a queue at the network entity 105-*a*, there may be some latency from when the network entity 105-*a* marks a data packet 245 and when the UE 115-*a* receives a marked data packet 250. Therefore, due to the latency of the UE 115-*a* receiving indication of congestion at the network entity 105-*a*, the effectiveness and reliability of the wireless communications system 200 supporting XR communications may decrease. For example, the UE 115-*a* may be unable to indicate to the application server 205 that the network entity 105-*a* is experiencing congestion until the UE 115-*a* receives a quantity of marked data packets.

In accordance with the techniques of the present disclosure, the UE 115-*a* may be capable of providing congestion information (e.g., channel quality measurements) to enhance the determinations made by the server side congestion controller 230 and the client side congestion controller 240 which can result in improved bitrates, reduced latency, or both. For example, the UE 115-*a* may be capable of providing additional information (e.g., link capacity estimation (LCE) measurements, signal to noise ratio (SNR) measurements, and the like) to complement the queueing delay information used by the network entity 105-*a*. The UE 115-*a* may also be capable of utilizing relatively more recent information to determine congestion at the network entity 105-*a*. For example, the network entity 105-*a* may perform tail marking (e.g., data packets 245 are marked based on congestion information as the data packets join a packet data convergence protocol (PDCP) queue) and the UE 115-*a* may be capable of obtaining relatively more recent CQI data (e.g., channel variations between when a data packet 245 joined a queue at the network entity 105-*a* and when the UE 115-*a* decodes the data packet 245). Additionally, or alternatively, the tail marking may delay the UE 115-*a* receiving the indication that the network entity 105-*a* is experiencing congestion.

Further, in some cases, the network entity 105-*a* may perform relatively unreliable marking determinations due to the network entity 105-*a* assuming that the UE 115-*a* is performing packet pacing even if the UE 115-*a* is refraining from performing any packet pacing. In some cases, the network entity 105-*a* may also perform relatively unreliable ECN field marking determinations due to CSI errors. In some examples, the CSI errors may be a result of noisy measurements by the UE 115-*a*. In some other examples, the CSI errors may be a result of time delays between the last CSI measurement. Such time delay may be a combination of a transmission delay between the UE and the network entity 105-*a* and the time since the network entity 105-*a* last received a CQI report from the UE 115-*a*. Additionally, or alternatively, the CSI errors may be due to CQI quantization errors.

In another example, the network entity 105-*a* may be incapable of supporting L4S ECN field marking. In such cases, the server side congestion controller 230 may fall back to using TCP reno behavior (e.g., a type of congestion control algorithm) which may result in a relatively high level of latency and a relatively high level of data loss. Thus, the application server 205 and the network entity 105-*a* may be incompatible with XR applications. Therefore, to ensure that the wireless communications system 200 is capable of supporting such XR applications, in accordance with the techniques of the present disclosure, the UE 115-*a* may utilize modem 235 side information for congestion control. For example, the UE 115-*a* may use congestion information obtained at the modem 235 to assist with reducing the impact to latency and data loss when the network entity 105-*a* is unable to aid in reducing latency and data loss. Further, in some examples, the techniques of the present disclosure may describe the modem 235 of the UE 115-*a* assisting the client side congestion controller 240 by altering ECN marking of the received data packets 245 that include marked data packets 250 before forwarding the data packets 245 to the upper layer (e.g., the client side congestion controller 240) via a communication link 252 between the modem 235 and the client side congestion controller 240. For example, the modem 235 may use information from local measurements that can affect the upper layer rate control determinations to alter the marking of the data packets without changing the procedures of the LAS framework.

In some examples, the LAS framework procedure may be initiated by the application server 205 forwarding, via the communication link 210, a set of data packets 245 to the network entity 105-*a*. Moreover, in some cases, the server side congestion controller 230 of the application server 205 may set the ECN field of the data packets 245 with a value indicating an ECT (1) codepoint (e.g., a value of 01 within the ECN field). Such value may indicate to the network entity 105-*a* that the application server 205 is LAS capable. The network entity 105-*a* may then perform ECN field marking in accordance with a marking policy to produce one or more marked packets 250. As illustrated within FIG. 2 herein, the marked packets 250 may be illustrated as shaded boxes within the set of data packets 245. However, while it is illustrated that a subset of the data packets 245 are marked data packets 250, it should be understood by one having ordinary skill in the art that any data packet 245 of the set of data packets 245 and any quantity of data packets 245 may be marked data packets 250.

After marking one or more data packets 245 as marked data packets 250, the network entity 105-*a* may transmit, via the communication link 220 (e.g., a downlink communication link), the data packets 245 to the UE 115-*a*. In some examples, the UE 115-*a* may receive and decode the data packets 245 at the modem 235 of the UE 115-*a*. The UE 115-*a* may then forward the data packets 245 to an upper application layer via the communication link 252 for the data packets 245 to be consumed and counted. For example, the data packets 245 may include video data and the UE 115-*a* can consume the video data via an application on the UE 115-*a*. Further, when the UE 115-*a* forwards the data packets 245 to an upper layer via the communication link 252, the client side congestion controller 240 may receive the data packets 245 from the modem 235 of the UE 115-*a* to count the quantity of marked data packets 250 and unmarked data packets 245 (e.g., the non-shaded data packets illustrated herein). After receiving the data packets 245 from the modem 235, the client side congestion controller 240 may count all the marked data packets 250 and all the unmarked data packets 245.

Based on counting the data packets 245, the client side congestion controller 240 may generate a feedback message 255 for the server side congestion controller 230 of the application server 205 in response to receiving the set of data packets 245. The feedback message 255 may include an indication of a first quantity of data packets 245 that include marked ECN fields (e.g., the quantity of marked data packets 250 in the set of received data packets 245) and a second quantity of data packets 245 that include unmarked ECN fields. The client side congestion controller 240 of the UE 115-*a* may transmit the feedback message 255 to the server side congestion controller 230 of the application server 205 by transmitting the feedback message 255 to the network entity 105-*a* via the communication link 225 and the network entity 105-*a* transmitting the feedback message to the application server 205 via the communication link 215. The server side congestion controller 230 of the application server 205 may then use the information indicated within the feedback message to adjust a bit rate for subsequent communications. For example, the server side congestion controller 230 may use the indication of the quantity of marked data packets 250 to determine whether to increase or decrease a bitrate (e.g., a video bitrate) for subsequent transmission of data packets 245.

In some examples, in accordance with the techniques of the present disclosure, the UE 115-*a* perform one or more ECN field modifications to the data packets 245 based on congestion information obtained at the modem 235 of the UE 115-*a*. For example, after decoding the data packets 245 from the network entity 105-*a*, the modem 235 of the UE 115-*a* may determine whether the current throughput of communications can be sustained based on modem 235 side data (e.g., congestion information). Based on such determination, the modem 235 of the UE 115-*a* may perform a modification procedure 260 on the ECN fields of one or more data packets 245 before forwarding the data packets 245 to the client side congestion controller 240 via the communication link 252. For example, the modem 235 may use congestion information such as a transfer time associated with the one or more data packets 245, an indication of a HARQ pattern, LCE measurements, SNR measurements, or any combination thereof to determine whether the throughput of a communication channel between the UE 115-*a* and the network entity 105-*a* (e.g., the communication link 220) can be sustained.

In order to modify the ECN fields the UE 115-*a* may transmit a capability message 265 to the network entity 105-*a* indicating that the UE 115-*a* is capable of performing a modification procedure 260 on an ECN field of a data packet. Based on the network entity 105-*a* receiving the capability message 265, the network entity 105-*a* may transmit a configuration message 270 to the UE 115-*a* that instructs the UE 115-*a* to perform the modification procedure 260 based on the capability message 265. Therefore, when the UE 115-*a* receives the data packets 245 that include ECN fields in the header portions of the data packets, the UE 115-*a* may be capable of modifying an ECN field of one or more data packets. In some cases, a UE 115-*a* may modify the ECN field of a first data packet 245 in accordance with the configuration message 270 and in accordance with congestion data associated with the communication link 220.

In some cases, the modem 235 of the UE 115 may determine that the bitrate is unstainable based on the congestion information obtained by the modem 235. Therefore, to indicate a higher level of congestion at the network, the modem 235 may modify the ECN field of one or more data packets to be set to the value that is indicative of congestion being experienced at the network entity 105-*a* (e.g., the CE value of the ECN field). For example, as illustrated herein, the network entity 105-*a* may transmit a set of eight data packets 245 to the UE 115-*a* with three data packets 245 being marked data packets 250. In some cases, the congestion information obtained by the modem 235 of the UE 115-*a* may indicate that the network entity 105-*a* is experiencing a higher level of congestion than the level of congestion being indicated via the quantity of marked data packets 250. For example, the modem 235 may detect a sudden drop in channel capacity that the network entity 105-*a* may have been unable to indicate in the initial data packet 245 ECN field markings. Thus, the UE 115-*a* may perform the modification procedure 260 on the data packets 245 to mark additional data packets 245. For example, the modem 235 may perform the modification procedure 260 to mark the ECN fields with the CE value of two additional data packets 245 such that out of a set of eight data packets 245, five data packets 245 (e.g., more than half) are marked data packets 250. In such cases, once the modem 235 forwards the data packets 245 to the client side congestion controller 240, the client side congestion controller 240 may count the quantity of marked data packets 250 and unmarked data packets 245. As a result, the client side congestion controller 240 may then indicate, to the application server 205 via feedback message 255 that is transmitted via the communication link 225 and the communication link 215, that the network entity 105-*a* is experiencing a relatively high level of congestion due to more than half of the received data packets being marked data packets 250.

In some other cases, the congestion information obtained by the modem 235 of the UE 115-*a* may indicate that the network entity 105-*a* is experiencing a relatively lower level of congestion than the level of congestion being indicated via the quantity of marked data packets 250. As such, the UE 115-*a* may perform the modification procedure 260 on the data packets 245 to erase the marking of one or more data packets 245. For example, if the modem 235 detects sudden improvements in channel quality or a considerable available capacity at the current time, the modem 235 may remove the marking of one or more data packets 245. Therefore, when the client side congestion controller 240 of the UE 115-*a* counts the quantity of marked data packets 250, the quantity may be relatively less than the initial indication by the network entity 105-*a*. Thus, the UE 115-*a* may indicate, via the feedback message 255, that the network entity 105-*a* is experiencing a relatively lower level of congestion. Moreover, when erasing the ECN marks of data packets, the modem 235 of the UE 115-*a* may be instructed, via the configuration message 270 to refrain from erasing all the ECN marks (e.g., may refrain from bleaching the ECN markings of the data packets 245). For example, if the modem 235 receives a set of data packets 245 with two marked data packets 250, the UE 115-*a* may refrain from removing the ECN field markings from both of the marked data packets 250.

In accordance with the techniques of the present disclosure, enabling the modem 235 of the UE 115-*a* to use the congestion information to provide relatively more reliable congestion control determinations for the server side congestion controller 230 and the client side congestion controller 240. For example, the quantity of information used for increasing bitrates based on network congestion may be increased by using the congestion information obtained by the modem 235 of the UE 115-*a*. Further, the techniques of the present disclosure described herein may refrain from altering the congestion control algorithms used by the server side congestion controller 230 and the client side congestion controller 240. The techniques of the present disclosure described herein may also refrain from altering the framework used by the UE 115-*a* for transmitting the feedback message 255 in response to counting the ECN field markings of the received data packets 245. Additionally, or alternatively, while the reliability of congestion control determinations may increase, the complexity of the modem 235 of the UE 115-*a* may also increase accordingly. For example, a quantity of computational resources consumed by the modem 235 of the UE 115-*a* may increase to determine whether to perform the modification procedure 260 to add or erase an ECN field marking of one or more data packets.

In some examples, to determine whether to perform the modification procedure 260 on one or more data packets 245, the modem 235 of the UE 115-*a* may compute a downlink channel (e.g., a physical downlink shared channel (PDSCH)) throughput level and compare the value to an LCE measurement of the downlink channel. For example, the modem 235 of the UE 115-*a* may compute the throughput level of the communication link 220 (e.g., $PDSCH_{tput}$) and compare the value an LCE measurement of the communication link 220. Thus, as shown below with reference to Equations 1 and 2, the modem 235 of the UE 115-*a* may determine to perform the modification procedure 260 based on a comparison of the throughput level of the communication link 220 and a product of a constant and the LCE measurement of the communication link 220. For example, as shown in Equation 1, if the throughput level of the communication link 220 is greater than or equal to the product, the modem 235 may perform the modification procedure 260 to add an ECN field marking to one or more data packets 245. Further, as shown in Equation 2, if the throughput level of the communication link 220 is less than or equal to the product, the modem 235 may perform the modification procedure 260 to erase or remove an ECN field marking from one or more data packets 245. Moreover, the intensity, probability, or both of the ECN field modifications may be based on a function of the throughput level of the communication link 220 and the LCE measurement of the communication link 220

$$\left(\text{e.g., } \frac{PDSCH_{tput}}{LCE}\right).$$

Additionally, or alternatively, the constant value that the LCE measurement is multiplied by to determine whether the modem 235 of the UE 115-*a* should add or erase ECN field markings may be pre-configured, indicated via the configuration message 270, determined by the UE 115-*a*, or any combination thereof. Further, it should be understood by one having ordinary skill in the art that such values indicated within Equations 1 and 2 may be different values and the illustrated values may be merely example values.

$$PDSCH_{tput} \geq 0.8 * LCE \quad (1)$$

$$PDSCH_{tput} \leq 0.5 * LCE \quad (2)$$

In some other examples, the modem 235 of the UE 115-*a* may perform the modification procedure 260 on the ECN fields of the received data packets 245 based on monitoring short-term signal to interference noise ratio (SINR) variations. For example, if a SINR variation over a period of time (e.g., ΔSINR) is less than a set value (e.g., ΔSINR<−5 dB), the modem 235 of the UE 115-*a* may add ECN field markings to the received data packets 245 and if the SINR variation is greater than a set value (e.g., ΔSINR>10 dB), the modem 235 of the UE 115-*a* may erase the ECN field markings from one or more of the received marked data packets 250. Moreover, the intensity, probability, or both, of the modem 235 performing the modification procedure 260 on the ECN fields may be a function of the SINR variation. Additionally, or alternatively, the period of time for the SINR variation and the values for determining whether the modem 235 of the UE 115-*a* should add or erase ECN field markings may be pre-configured, indicated via the configuration message 270, determined by the UE 115-*a*, or any combination thereof.

In another example, the modem 235 of the UE 115-*a* may perform the modification procedure 260 on the ECN fields of the received data packets 245 based on monitoring a HARQ pattern or a short-term block error rate (BLER) measurement. For example, the modem 235 of the UE 115-*a* may compare the BLER rate of communications via the communication link 220 to a pre-configured or indicated rate (e.g., indicated via the configuration message 270). In some cases, based on the comparison (e.g., BLER>30%) the UE 115-*a* may determine a short-term BLER spike that creates a short-term congestion spike indication. Using such information, the modem 235 of the UE 115-*a* may determine whether to add ECN field markings to the received data packets 245 to indicate a higher level of congestion or whether to erase ECH markings from marked data packets 250 to indicate a lower level of congestion. Moreover, in such examples, the intensity, probability, or both, of the modem 235 of the UE 115-*a* performing the modification procedure 260 on an ECN field of a respective data packet may be based on a function of a SINR variation (e.g., ΔSINR).

In some other examples, the modem 235 of the UE 115-*a* may detect that the network entity 105-*a* is systematically marking that last data packets 245 in a packet data unit (PDU) set due to a lack of pacing. Thus, the modem 235 of the UE 115-*a* may determine to erase all ECN field markings at the tail of a respective PDU set such that the ECN field markings of the respective PDU set accurately portrays the congestion level of the network entity 105-*a*. Additionally, or alternatively, the modem 235 of the UE 115-*a* may track the ECN marking rate from the network entity 105-*a* and may perform the modification procedure 260 on the ECN fields of the received data packets until the network entity 105-*a* catches up with the new congestion information. For example, since the network entity 105-*a* may perform tail marking of ECN fields, there may be some delay between when the UE 115-*a* detects a change in a congestion level at the network entity 105-*a* and when the UE 115-*a* receives data packets 245 indicating a correct congestion level. Thus, to reduce power consumption at the UE 115-*a* in accordance with supporting XR communications, the UE 115-*a* may refrain from performing the modification procedure 260 when the ECN fields of the received data packets 245 accurately reflect the congestion level of the network entity 105-*a*.

Thus, the congestion information obtained by the modem 235 of the UE 115-*a* for performing the modification procedure 260 on the ECN fields may aid the server side congestion controller 230 and the client side congestion controller 240 in ensuring the wireless communications system 200 can support XR communications. Further descriptions of such techniques of the present disclosure may be described elsewhere herein such as with reference to FIG. 3. Further descriptions of the techniques of the present disclosure where the modem 235 of the UE 115-*a* obtains congestion information to ensure the wireless communications system 200 can support XR communications may be described elsewhere herein such as with reference to FIGS. 4 and 5.

Figure 3:
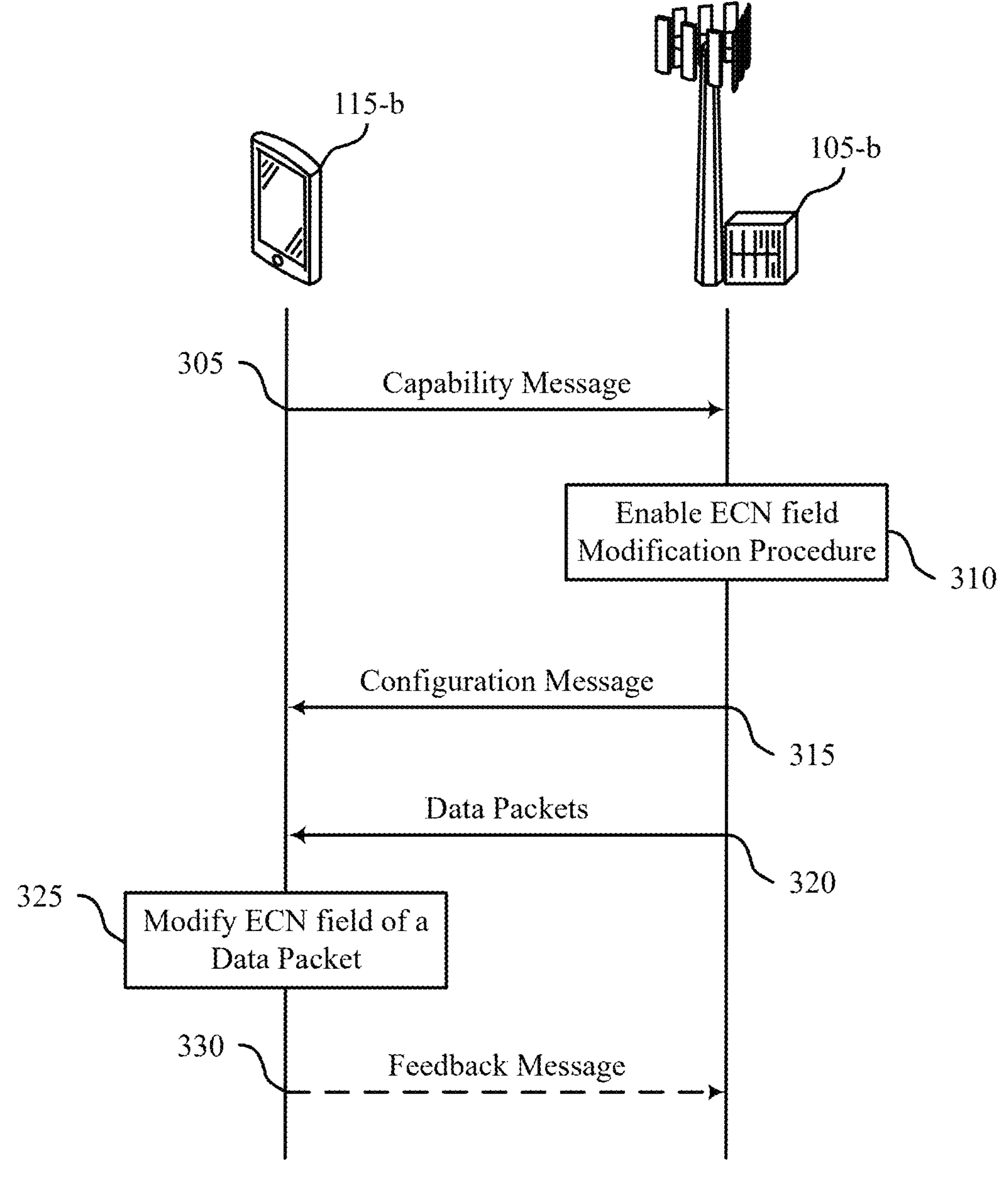
FIG. 3 shows an example of a process flow that supports device assisted congestion control in accordance with one or more aspects of the present disclosure.

FIG. 3 shows an example of a process flow 300 that supports device assisted congestion control in accordance with one or more aspects of the present disclosure. In some examples, the process flow 300 may implement or be implemented by the wireless communications system 100, the wireless communications system 200, or both. For example, the process flow 300 may include a UE 115-*b* and a network entity 105-*b*, which may be examples of devices described herein with reference to FIGS. 1 and 2.

In the following description of the process flow 300, the operations between the UE 115-*b* and the network entity 105-*b* may be performed in different orders or at different times. Some operations may also be left out of the process flow 300, or other operations may be added. Although the UE 115-*b* and the network entity 105-*b* are shown performing the operations of the process flow 300, some aspects of some operations may also be performed by one or more other wireless devices.

At 305, the UE 115-*b* may transmit, to the network entity 105-*b*, a capability message indicating that the UE 115-*b* is capable of performing a modification procedure on one or more ECN fields associated with a data packet. At 310 the network entity 105-*b* may determine to enable the UE to perform the modification procedure on the ECN fields of data packets. Thus, at 315, the UE 115-*b* may receive, from the network entity 105-*b*, a configuration message instructing the UE 115-*b* to perform the modification procedure based on the capability message. Further, at 320, the UE 115-*b* may receive, via a first wireless channel between the UE 115-*b* and the network entity 105-*b*, one or more data packets. The one or more data packets may include respective ECN fields in respective header portions of the one or more data packets.

At 325, the UE 115-*b* may modify an ECN field of a first data packet of the one or more data packets based on receiving the configuration message. In some examples, the UE 115-*b* may modify the ECN field of the first data packet to add a marking of congestion to the ECN field. In some other examples, the UE 115-*b* may modify the ECN field of the first data packet to remove a marking of congestion from the ECN field. In some cases, the UE 115-*b* may send the one or more data packets from a modem of the UE 115-*b* to a congestion controller of the UE 115-*b*, where the ECN field of the first data packet is modified at the modem of the UE 115-*b*. Therefore, the ECN field of the first data packet may be modified via the modification procedure based on congestion information associated with the first wireless channel. In some examples, the congestion information may include an indication of a throughput level, an indication of a transfer time associated with the one or more data packets, an indication of a HARQ pattern, one or more LCE associated with the first wireless channel, one or more SNR or SINR measurements associated with the first wireless channel, or any combination thereof. At 330, based on receiving the one or more data packets, the UE 115-*b* may transmit, to the network entity 105-*b*, a feedback message including an ECN marking report. The ECN marking report may indicate a first quantity of data packets of the one or more data packets that include a marked ECN field and indicate a second quantity of data packets from the one or more data packets that include an unmarked ECN field. In some examples, the first quantity of data packets and the second quantity of data packets indicated via the ECN marking report may be based on the ECN field of the first data packet being modified via the modification procedure.

Figure 4:
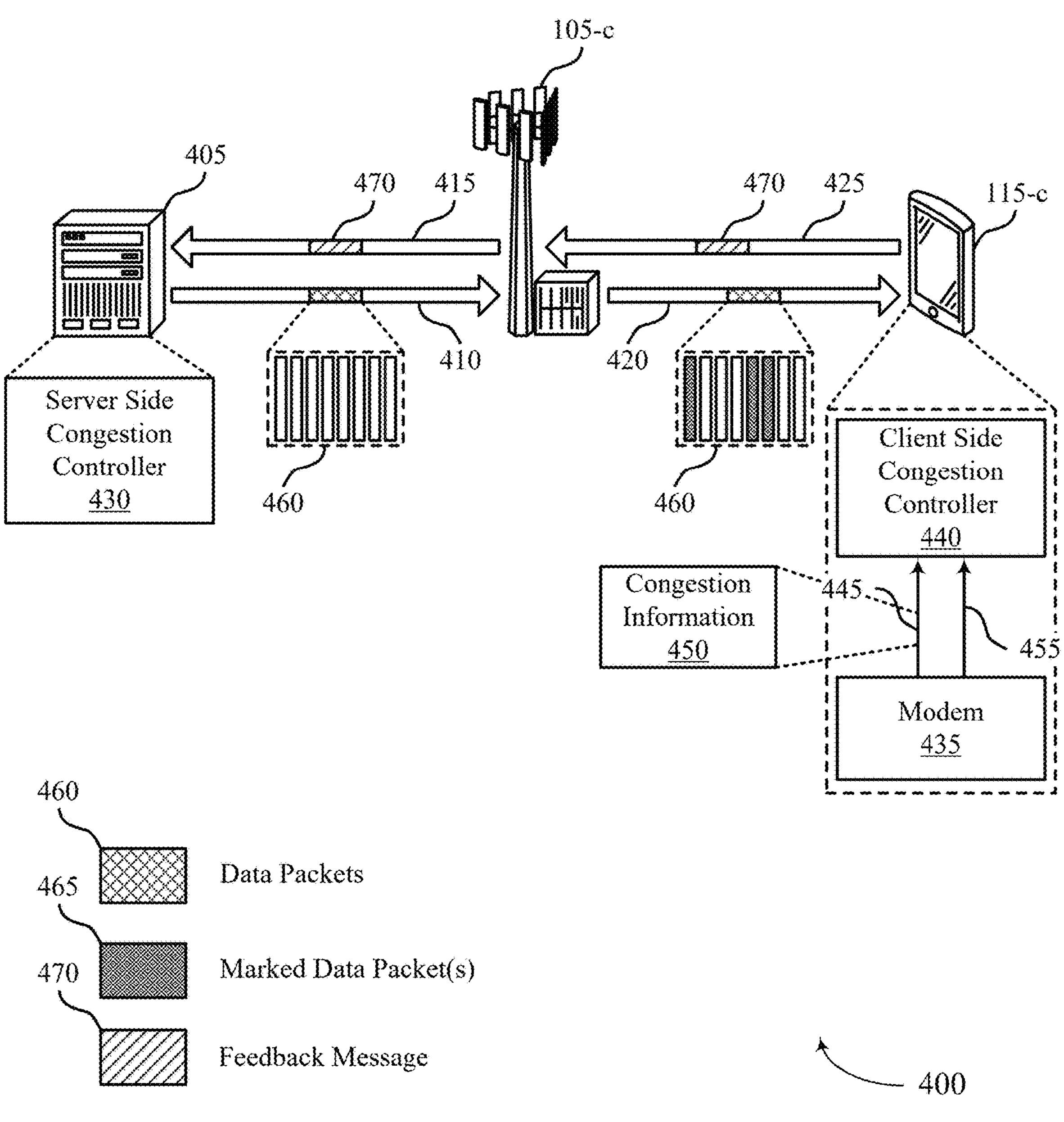
FIG. 4 shows an example of a wireless communications system that supports device assisted congestion control in accordance with one or more aspects of the present disclosure.

FIG. 4 shows an example of a wireless communications system 400 that supports device assisted congestion control in accordance with one or more aspects of the present disclosure. In some examples, the wireless communications system 200 may implement or be implemented by the wireless communications system 100. For example, the wireless communications system 400 may include a network entity 105-*c* associated with an application server 405, and a UE 115-*c*, which may be examples of devices described herein with reference to FIG. 1. In some examples, the application server 405 may communicate with the network entity 105-*c* via a communication link 410 and the network entity 105-*c* may communicate with the application server 405 via a communication link 415. Further, the network entity 105-*c* may communicate with the UE 115-*c* via a communication link 420 (e.g., a downlink communication link) and the UE 115-*c* may communicate with the network entity 105-*c* via a communication link 425 (e.g., an uplink communication link). Such communication links may be examples of a communication link 125 described herein with reference to FIG. 1. For example, the communication link 410, the communication link 415, the communication link 420, and the communication link 425, may be examples of a Uu link, a sidelink, a backhaul link, a D2D link or some other type of communication link 125 described herein with reference to FIG. 1 and the communication link 420 and the communication link 425 may be examples of a sidelink, a D2D link, or some other type of communication link 125 described herein with reference to FIG. 1. Further, the application server 405 may include a server side congestion controller 430 and the UE 115-*c* may include a modem 435 and a client side congestion controller 440.

In some examples, in accordance with the techniques of the present disclosure, the UE 115-*c* may establish an API 445 (e.g., a cross-layer API) between the modem 435 of the UE 115-*c* and the client side congestion controller 440 of the UE 115-*c*. Therefore, the modem 435 may be capable of communicating and exchanging information (e.g., congestion information 450) with the client side congestion controller 440. Additionally, or alternatively, the UE 115-*c* may also have a communication link 455 between the modem 235 may and the client side congestion controller 440. For example, in some cases, the modem 435 of the UE 115-*c* may receive a set of data packets 460 from the network entity 105-*c* via the communication link 420 and forward the set of data packets 460 to the client side congestion controller 440 of the UE 115-*c* via the communication link 455. Moreover, as described elsewhere herein such as with reference to FIG. 2, the set of data packets 460 may include one or more marked data packets 465 (e.g., data packets 460 with an ECN field indication that the network entity 105-*c* is experiencing congestion via a CE indication).

Thus, in accordance with the techniques of the present disclosure, to reduce the congestion of the network entity 105-*c*, the client side congestion controller 440 of the UE 115-*c* may utilize the congestion information 450 to generate a feedback message for the server side congestion controller 430. Further, the UE 115-*c* may transmit the feedback message to the application server 405 based on obtaining the congestion information 450 at the client side congestion controller 440 of the UE 115-*c* from the modem 435 of the UE 115-*c* via the API 445. In some examples, congestion information 450 obtained at the client side congestion controller 440 may include measurement data obtained at the modem 435 of the UE 115-*c*. For example, the modem 435 of the UE 115-*c* may obtain LCE measurements, SNR measurements, SINR measurements, or any combination thereof that are associated with the communication link 420 (e.g., the downlink communication link). The congestion information 450 may also include transfer time information associated with the received data packets 460, HARQ pattern information, or both.

In some examples, in response to the client side congestion controller 440 receiving the one or more data packets 460 and the congestion information 450, the client side congestion controller 440 may perform a packet counting procedure. The client side congestion controller 440 of the UE 115-*c* may perform the packet counting procedure to detect a first quantity of marked data packets 465 within the one or more data packets 460 and a second quantity of unmarked data packets 460 within the one or more data packets 460. The UE 115-*c* may then transmit an ECN field marking report that includes first quantity and the second quantity to the application server 405 via the feedback message 470 to indicate a level of congestion at the network entity 105-*c*. Although, in accordance with the techniques of the present disclosure, in some examples, the client side congestion controller 440 of the UE 115-*c* may modify the first quantity, the second quantity, or both based on the congestion information 450. For example, the client side congestion controller 440 may utilize the congestion information 450 to modify or alter the quantity of data packets 460 reported to the application server 405 as marked data packets 465.

In some cases, the congestion information 450 may indicate that the network entity 105-*c* is experiencing a relatively higher level of congestion than the level of congestion indicated via the quantity of marked data packets 465. Thus, the client side congestion controller 440 may increase the quantity of marked data packets 465 (e.g., the first quantity of data packets 460) and decrease the quantity of unmarked data packets 460 (e.g., the second quantity of data packets 460) reported to the application server 405. Moreover, in accordance with the techniques of the present disclosure and as illustrated herein, rather than altering the actual ECN fields of the data packets 460, the UE 115-*c* may instead alter the count of marked data packets 465 and unmarked data packets 460 to indicate a different level of congestion than the level of congestion indicated by the network entity 105-*c* by utilizing the congestion information 450. Therefore, by altering the count of marked data packets 465 and unmarked data packets 460, the server side congestion controller 430 may be capable of performing a more accurate and efficient congestion detection to determine whether to adjust the bitrate of subsequent communications.

In some examples, opposed to having the server side congestion controller 430 of the application server 405 calculate an adjusted bitrate, the client side congestion controller 440 of the UE 115-*c* may compute a target bitrate for subsequent communications. For example, in response to the client side congestion controller 440 of the UE 115-*c* obtaining, via the communication link 455, the one or more data packets 460 and the congestion information 450, via the API 445, the client side congestion controller 440 may determine a target bitrate. Moreover, the UE 115-*c* may transmit the target bitrate via the feedback message 470 opposed to transmitting an indication of a first quantity of marked data packets 465 and a second quantity of unmarked data packets 460 via the feedback message 470. By transmitting the target bitrate via the feedback message 470 the techniques of the present disclosure may enable more accurate and reliable congestion control determinations for the wireless communications system 400. For example, the congestion control determinations may be relatively more accurate and reliable due to an increase in information and an increase in relevancy of the information used for congestion control determinations.

Moreover, such techniques of the present disclosure may be relatively simple to implement due to minimal changes to the modem 435 at the UE 115-*c*. Additionally, or alternatively, having the client side congestion controller 440 of the UE 115-*c* determine the target bitrate may be relatively more scalable than having the server side congestion controller 430 of the application server 405 determine the target bitrate. For example, the application server 405 may serve a relatively large quantity of UEs 115 and determining a target bitrate for each UE 115 that the application server 405 serves may be relatively time consuming and may consume a relatively large quantity of computational resources. Thus, having each UE 115 determine an individual target bitrate may be relatively more efficient and reliable. Additionally, or alternatively, if the wireless communications system 400 uses TCP Prague as a transport protocol and for a congestion control algorithm (e.g., instead of UDP/RTP and an application-layer congestion control algorithm), the client side congestion controller 440 may transmit a target congestion window to the application server 405 instead of a target bitrate.

Further, such techniques of the present disclosure may increase the complexity of the client side congestion controller 440. For example, the client side congestion controller 440 may consume additional computational resources to determine the target bitrate. Additionally, or alternatively, the format of the feedback message 255 may be changed to be capable of indicating a target bitrate opposed to an ECN field marking report. Thus, in some examples, to reduce the computational resource consumption at the client side congestion controller 440 of the UE 115-*c*, in accordance with the techniques of the present disclosure, the UE 115-*c* may transmit both an ECN marking report and the congestion information 450 to the application server 405 via the feedback message 470.

For example, after performing the packet counting procedure, the client side congestion controller 440 of the UE 115-*a* may generate a feedback message 470 to be transmitted to the application server 405. Such feedback message may include both an ECN marking report indicating the quantity of marked data packets 465 and unmarked data packets 460 received from the network entity 105-*c* and the congestion information 450 received from the modem 435 of the UE 115-*c* via the API 445. Thus, the application server 405 may utilize both the ECN field marking report and the congestion information 450 from the modem 435 of the UE 115-*c* to adjust the bitrate for subsequent communications. Moreover, if the wireless communications system 400 uses TCP Prague as the transport protocol and congestion control algorithm, the UE 115-*c* may instead transmit the congestion information 450 to the application layer via an options field of the TCP header of the feedback message 470. Such techniques of the present disclosure may enable relatively more efficient and reliable congestion control determinations at the application server 405 due to an increase in information available for the congestion control determinations. Further, such techniques of the present disclosure may refrain from increasing the complexity of the UE 115-*c* thus resulting in a relatively simple implementation due to the minimal changes to the modem 435 of the UE 115-*c*.

Although, the complexity of the server side congestion controller 430 may be increased due to the integration of the congestion information 450 from the modem 435 of the UE 115-*c*. Further, if the wireless communications system 400 uses TCP Prague, the client side congestion controller 440 may experience a slight increase in complexity. For example, since the UE 115-*c* has to transmit the congestion information 450 within the options field of a TCP header of the feedback message 470, the client side congestion controller 440 may quantize the congestion information 450 to ensure the data fits within the options field. However, utilizing the congestion information 450 for determining congestion control determinations at the server side congestion controller 430, the client side congestion controller 440, or both may increase the accuracy, reliability, and efficiency of congestion control within the wireless communications system 400. Therefore, the techniques of the present disclosure may enable the application server 405, the UE 115-*c*, or both to utilize the congestion information 450 to ensure that the wireless communications system is capable of effectively and reliably supporting XR communications by performing accurate and reliable congestion control. Further descriptions of the techniques of the present disclosure may be described elsewhere herein such as with reference to FIG. 5.

Figure 5:
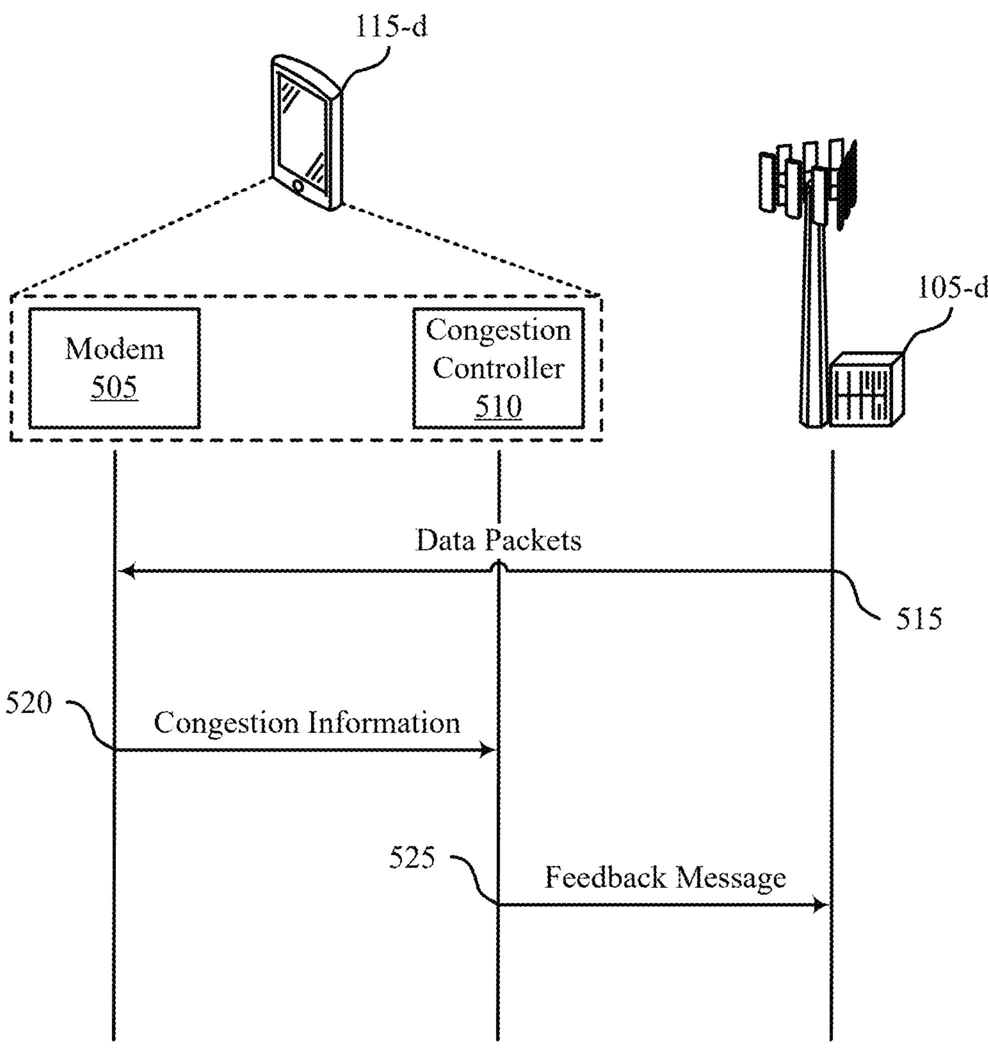
FIG. 5 shows an example of a process flow that supports device assisted congestion control in accordance with one or more aspects of the present disclosure.

FIG. 5 shows an example of a process flow 500 that supports device assisted congestion control in accordance with one or more aspects of the present disclosure. In some examples, the process flow 500 may implement or be implemented by the wireless communications system 100, the wireless communications system 400, or both. For example, the process flow 500 may include a UE 115-*d* that is associated with a modem 505 and a congestion controller 510, and a network entity 105-*d*, which may be examples of devices described herein with reference to FIGS. 1 and 4.

In the following description of the process flow 500, the operations between the modem 505 of the UE 115-*d*, the congestion controller 510 of the UE 115-*d*, and the network entity 105-*d* may be performed in different orders or at different times. Some operations may also be left out of the process flow 500, or other operations may be added. Although the modem 505 of the UE 115-*d*, the congestion controller 510 of the UE 115-*d*, and the network entity 105-*d* are shown performing the operations of the process flow 500, some aspects of some operations may also be performed by one or more other wireless devices.

At 515, the UE 115-*d* may receive, via the modem 505 over a first wireless channel between the UE 115-*d* and the network entity 105-*d*, one or more data packets. The one or more data packets may include respective ECN fields in respective header portions of the one or more data packets. Moreover, the UE 115-*d*, may establish an API between the modem 505 of the UE 115-*d* and a congestion controller 510 of the UE 115-*d*.

At 520, the modem 505 of the UE 115-*d* may send congestion information associated with the one or more data packets received via the first wireless channel to the congestion controller 510 of the UE 115-*d*. In some cases, UE 115-*d* may send the congestion information from the modem 505 of the UE 115-*d* to the congestion controller 510 of the UE 115-*d* via the API that is established between the modem 505 and the congestion controller 510. In some cases, the congestion information may include an indication of a transfer time associated with the one or more data packets, an indication of a HARQ pattern, one or more LCE measurements associated with the first wireless channel, one or more SNR or SINR measurements associated with the first wireless channel, or any combination thereof.

At 525, the UE 115-*d* may transmit a feedback message associated with the one or more data packets. The feedback message may be based on the congestion information received at the congestion controller 510 of the UE 115-*d* from the modem 505 of the UE 115-*d*. In some examples, the feedback message may include an ECN field marking report that includes the first quantity of data packets and the second quantity of data packets based on performing a packet counting procedure. For example, in response to receiving the data packets from the network entity 105-*d* and the congestion information from the modem 505 of the UE 115-*d*, the congestion controller 510 of the UE 115-*d* may perform a packet counting procedure. The packet counting procedure may be to detect a first quantity of data packets of the one or more data packets that include a marked ECN field and a second quantity of data packets from the one or more data packets that include an unmarked ECN field. Moreover, in some cases, the congestion controller 510 of the UE 115-*d* may modify the first quantity of data packets, the second quantity of data packets, or both that are indicated via ECN field marking report based on the congestion information. Thus, the UE 115-*d* may transmit a modified ECN field marking report based on the congestion information.

In some other examples, the feedback message may include an indication of a target bitrate for subsequent communications, with the target bitrate being based on the congestion information. In some cases, based on a type of transport protocol used by the UE 115-*d*, the UE 115-*c* may include an indication of a target congestion window for subsequent communications via the feedback message. Moreover, the target congestion window may be based on the congestion information. Additionally, or alternatively, the UE 115-*c* may transmit, to the network entity 105-*d*, the feedback message including both an ECN field marking report and the congestion information associated with the one or more data packets. The ECN field marking report may indicate a first quantity of data packets of the one or more data packets that include a marked ECN field and a second quantity of data packets from the one or more data packets that include an unmarked ECN field.

Figure 6:
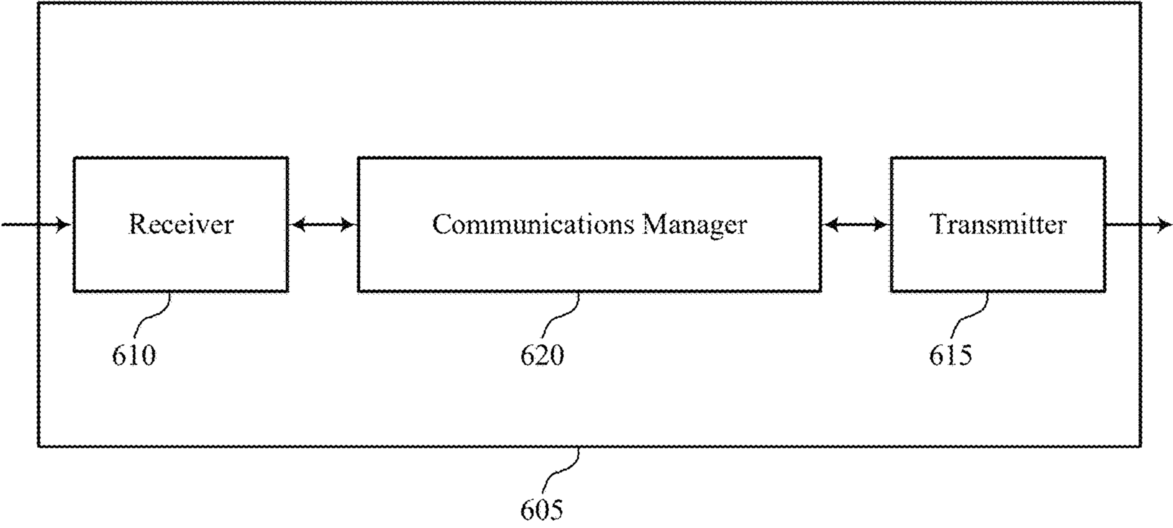
FIGS. 6 and 7 show block diagrams of devices that support device assisted congestion control in accordance with one or more aspects of the present disclosure.

FIG. 6 shows a block diagram 600 of a device 605 that supports device assisted congestion control in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to device assisted congestion control). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to device assisted congestion control). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of device assisted congestion control as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for transmitting a capability message indicating that the UE is capable of performing an ECN field modification procedure on a data packet. The communications manager 620 is capable of, configured to, or operable to support a means for receiving a configuration message instructing the UE to perform the ECN field modification procedure based on the capability message. The communications manager 620 is capable of, configured to, or operable to support a means for receiving, via a first wireless channel, one or more data packets, where the one or more data packets include respective ECN fields in respective header portions of the one or more data packets. The communications manager 620 is capable of, configured to, or operable to support a means for modifying an ECN field of a first data packet of the one or more data packets based on receiving the configuration message.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for improving rate adaptations for subsequent communications by utilizing congestion information obtained at the modem of a UE 115 to support reduced processing, reduced power consumption, and more efficient utilization of communication resources.

Figure 7:
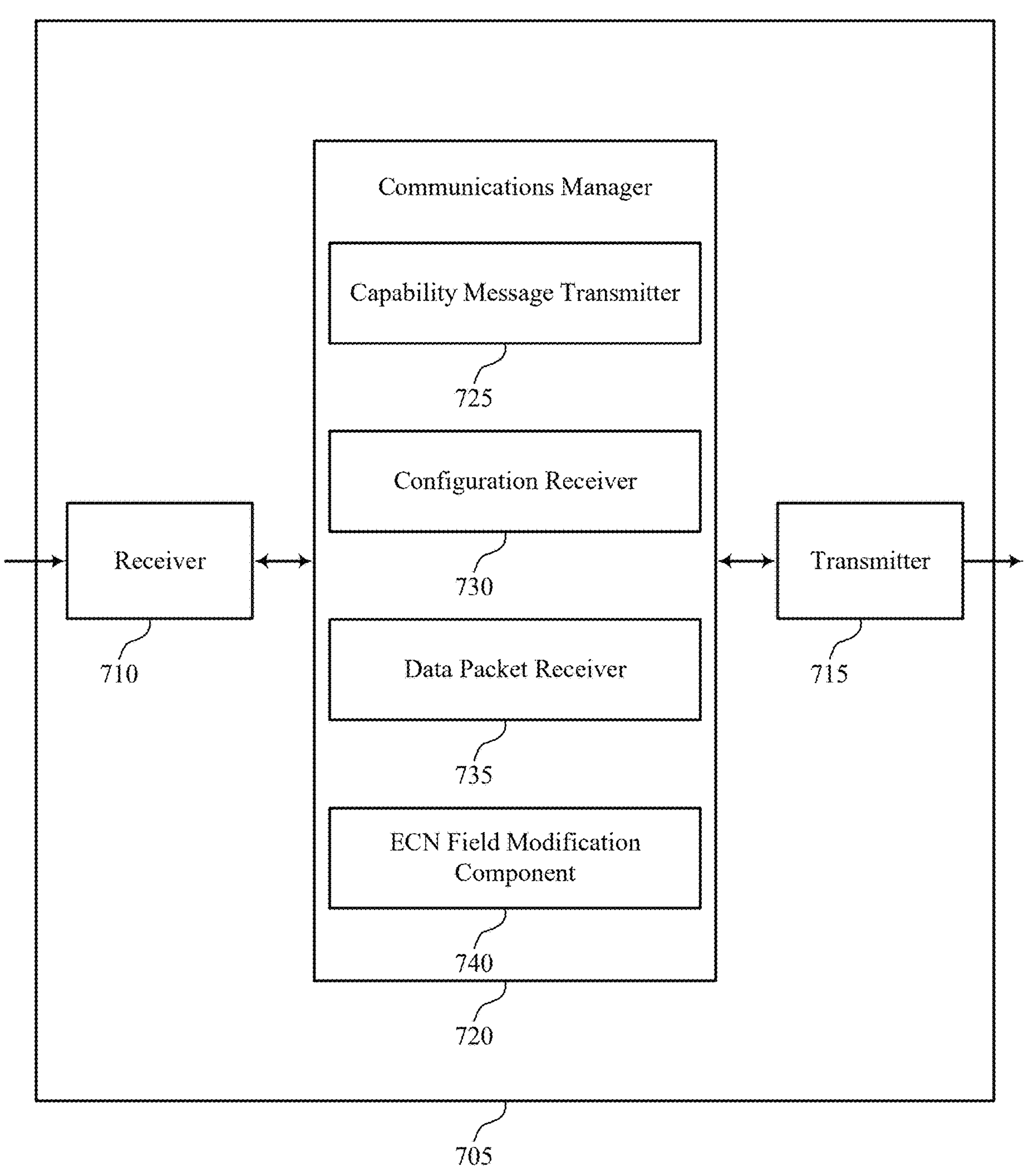

FIG. 7 shows a block diagram 700 of a device 705 that supports device assisted congestion control in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to device assisted congestion control). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to device assisted congestion control). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of device assisted congestion control as described herein. For example, the communications manager 720 may include a capability message transmitter 725, a configuration receiver 730, a data packet receiver 735, a ECN field modification component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The capability message transmitter 725 is capable of, configured to, or operable to support a means for transmitting a capability message indicating that the UE is capable of performing an ECN field modification procedure on a data packet. The configuration receiver 730 is capable of, configured to, or operable to support a means for receiving a configuration message instructing the UE to perform the ECN field modification procedure based on the capability message. The data packet receiver 735 is capable of, configured to, or operable to support a means for receiving, via a first wireless channel, one or more data packets, where the one or more data packets include respective ECN fields in respective header portions of the one or more data packets. The ECN field modification component 740 is capable of, configured to, or operable to support a means for modifying an ECN field of a first data packet of the one or more data packets based on receiving the configuration message.

Figure 8:
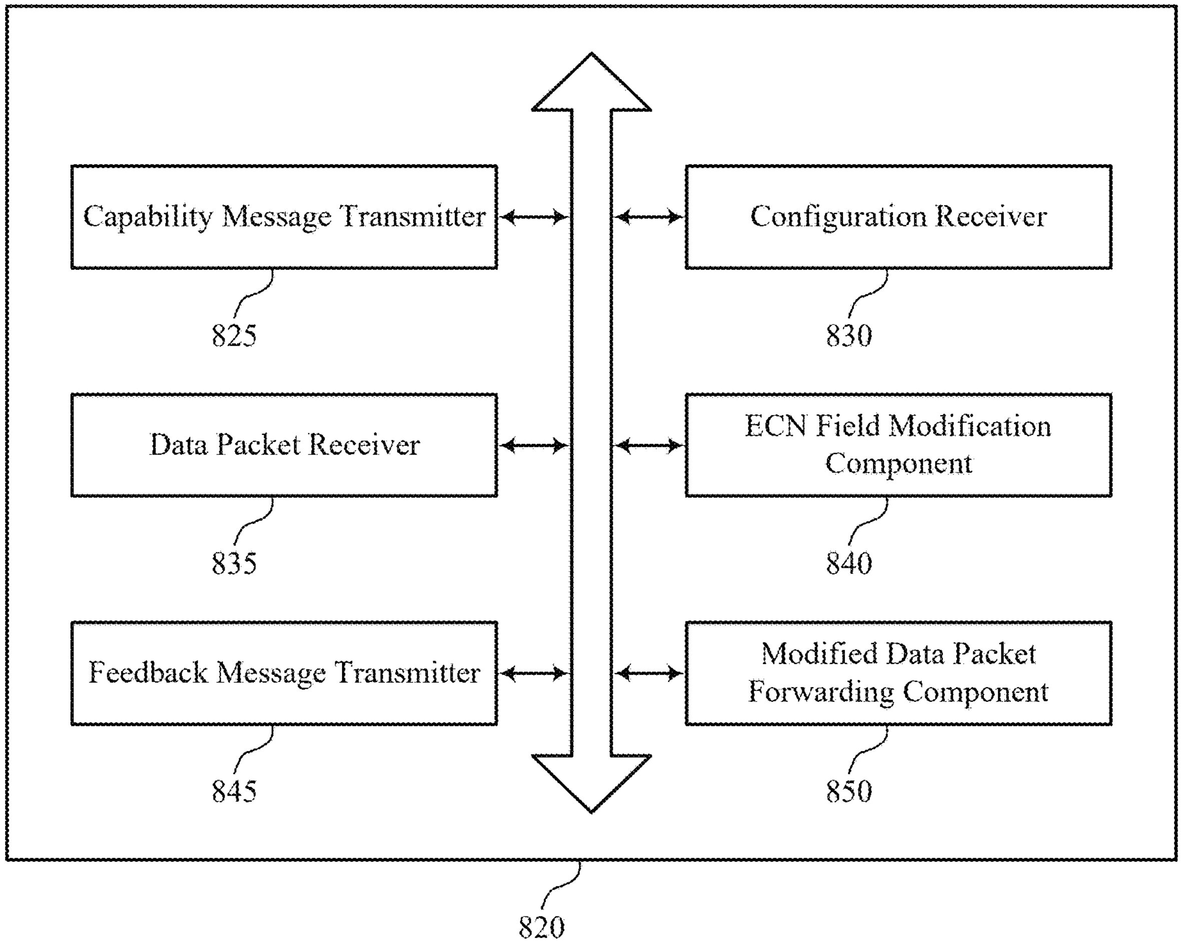
FIG. 8 shows a block diagram of a communications manager that supports device assisted congestion control in accordance with one or more aspects of the present disclosure.

FIG. 8 shows a block diagram 800 of a communications manager 820 that supports device assisted congestion control in accordance with one or more aspects of the present disclosure. The communications manager 820 may be an example of aspects of a communications manager 620, a communications manager 720, or both, as described herein. The communications manager 820, or various components thereof, may be an example of means for performing various aspects of device assisted congestion control as described herein. For example, the communications manager 820 may include a capability message transmitter 825, a configuration receiver 830, a data packet receiver 835, a ECN field modification component 840, a modified data packet forwarding component 850, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The capability message transmitter 825 is capable of, configured to, or operable to support a means for transmitting a capability message indicating that the UE is capable of performing an ECN field modification procedure on a data packet. The configuration receiver 830 is capable of, configured to, or operable to support a means for receiving a configuration message instructing the UE to perform the ECN field modification procedure based on the capability message. The data packet receiver 835 is capable of, configured to, or operable to support a means for receiving, via a first wireless channel, one or more data packets, where the one or more data packets include respective ECN fields in respective header portions of the one or more data packets. The ECN field modification component 840 is capable of, configured to, or operable to support a means for modifying an ECN field of a first data packet of the one or more data packets based on receiving the configuration message.

In some examples, the feedback message transmitter 845 is capable of, configured to, or operable to support a means for transmitting, based on receiving the one or more data packets, a feedback message including an ECN marking report, the ECN marking report indicating a first quantity of data packets of the one or more data packets that include a marked ECN field and indicating a second quantity of data packets from the one or more data packets that include an unmarked ECN field.

In some examples, the first quantity of data packets and the second quantity of data packets indicated via the ECN marking report are based on the ECN field of the first data packet being modified via the ECN field modification procedure.

In some examples, to support modifying the ECN field of the first data packet, the ECN field modification component 840 is capable of, configured to, or operable to support a means for modifying the ECN field of the first data packet to add a marking of congestion to the ECN field.

In some examples, to support modifying the ECN field of the first data packet, the ECN field modification component 840 is capable of, configured to, or operable to support a means for modifying the ECN field of the first data packet to remove a marking of congestion to the ECN field.

In some examples, the modified data packet forwarding component 850 is capable of, configured to, or operable to support a means for sending the one or more data packets from a modem of the UE to a congestion controller of the UE, where the ECN field of the first data packet is modified at the modem of the UE.

In some examples, the ECN field of the first data packet is modified via the ECN field modification procedure based on congestion information associated with the first wireless channel.

In some examples, the congestion information includes an indication of a throughput level, an indication of a transfer time associated with the one or more data packets, an indication of a HARQ pattern, one or more link capacity measurements associated with the first wireless channel, one or more SNR measurements associated with the first wireless channel, or any combination thereof.

Figure 9:
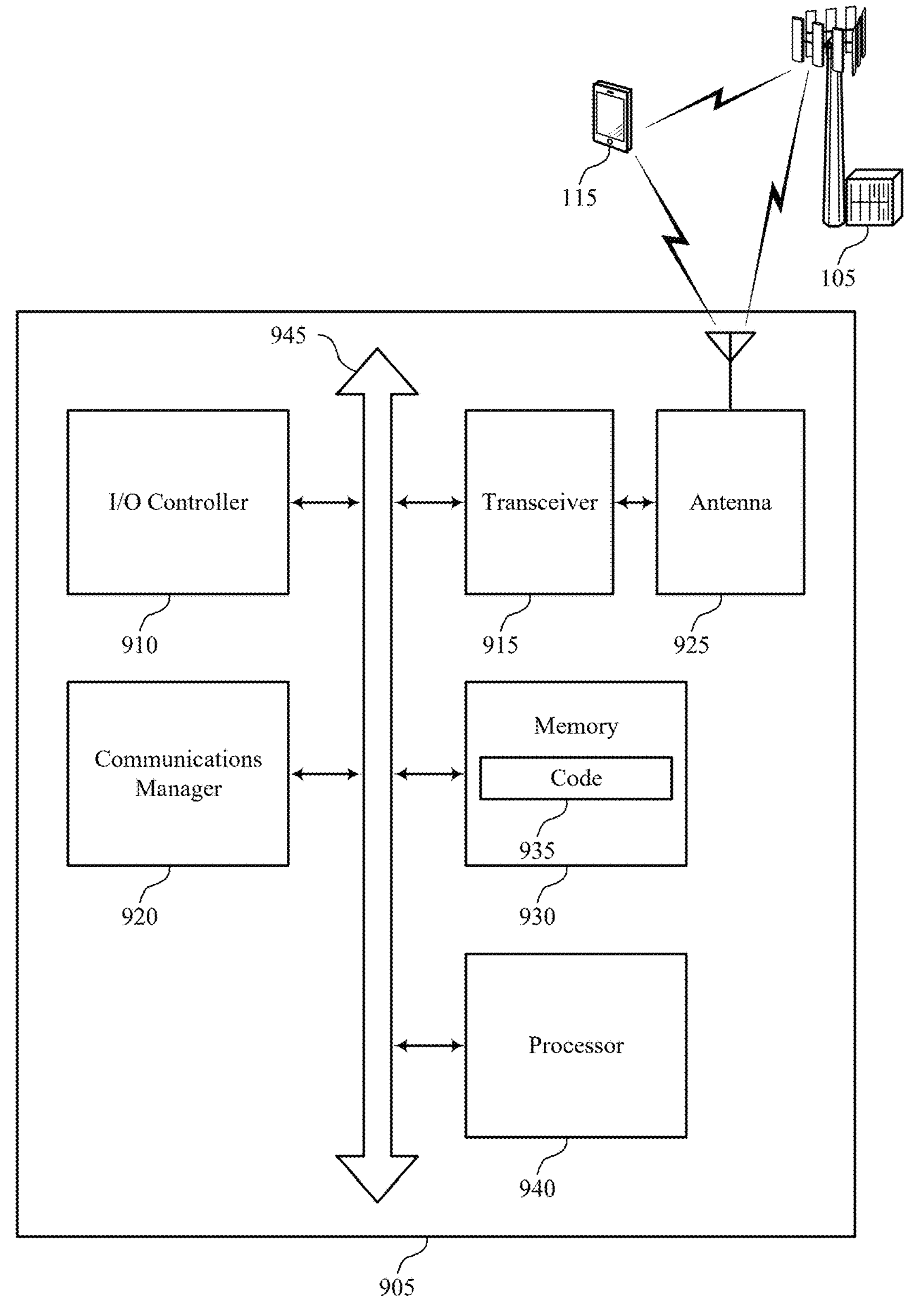
FIG. 9 shows a diagram of a system including a device that supports device assisted congestion control in accordance with one or more aspects of the present disclosure.

FIG. 9 shows a diagram of a system 900 including a device 905 that supports device assisted congestion control in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting device assisted congestion control). For example, the device 905 or a component of the device 905 may include at least one processor 940 and at least one memory 930 coupled with or to the at least one processor 940, the at least one processor 940 and the at least one memory 930 configured to perform various functions described herein.

In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for transmitting a capability message indicating that the UE is capable of performing an ECN field modification procedure on a data packet. The communications manager 920 is capable of, configured to, or operable to support a means for receiving a configuration message instructing the UE to perform the ECN field modification procedure based on the capability message. The communications manager 920 is capable of, configured to, or operable to support a means for receiving, via a first wireless channel, one or more data packets, where the one or more data packets include respective ECN fields in respective header portions of the one or more data packets. The communications manager 920 is capable of, configured to, or operable to support a means for modifying an ECN field of a first data packet of the one or more data packets based on receiving the configuration message.

By including or configuring the communications manager 920 in accordance with examples as described herein, the device 905 may support techniques for improving rate adaptations for subsequent communications by utilizing congestion information obtained at the modem of a UE 115 to support improved communication reliability, reduced latency, improved user experience related to reduced processing, reduced power consumption, more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of device assisted congestion control as described herein, or the at least one processor 940 and the at least one memory 930 may be otherwise configured to, individually or collectively, perform or support such operations.

Figure 10:
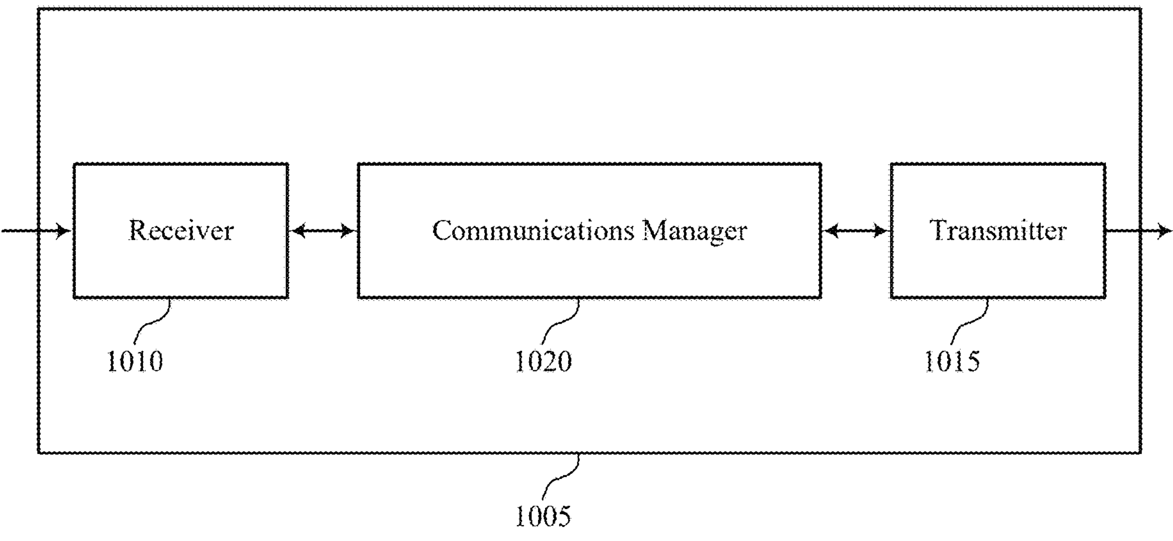
FIGS. 10 and 11 show block diagrams of devices that support device assisted congestion control in accordance with one or more aspects of the present disclosure.

FIG. 10 shows a block diagram 1000 of a device 1005 that supports device assisted congestion control in accordance with one or more aspects of the present disclosure. The device 1005 may be an example of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to device assisted congestion control). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to device assisted congestion control). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations or components thereof may be examples of means for performing various aspects of device assisted congestion control as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for receiving, at a modem of the UE via a first wireless channel, one or more data packets, where the one or more data packets include respective ECN fields in respective header portions of the one or more data packets. The communications manager 1020 is capable of, configured to, or operable to support a means for sending, from the modem of the UE to a congestion controller of the UE, congestion information associated with the one or more data packets received via the first wireless channel. The communications manager 1020 is capable of, configured to, or operable to support a means for transmitting a feedback message associated with the one or more data packets, the feedback message being based on the congestion information received at the congestion controller of the UE from the modem of the UE.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for improving rate adaptations for subsequent communications by utilizing congestion information obtained at the modem of a UE 115 to support reduced processing, reduced power consumption, and more efficient utilization of communication resources.

Figure 11:
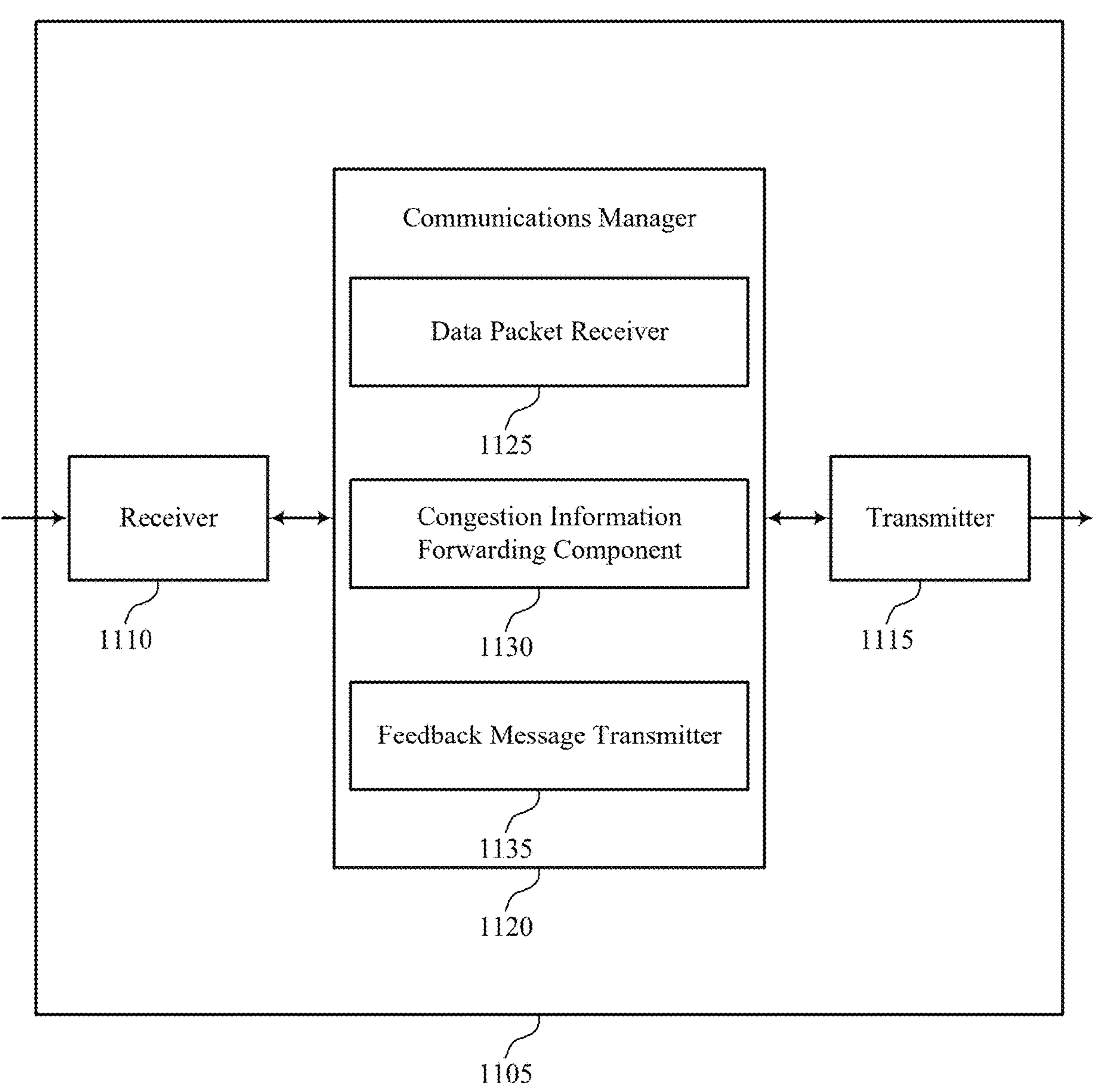

FIG. 11 shows a block diagram 1100 of a device 1105 that supports device assisted congestion control in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to device assisted congestion control). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to device assisted congestion control). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of device assisted congestion control as described herein. For example, the communications manager 1120 may include a data packet receiver 1125, a congestion information forwarding component 1130, a feedback message transmitter 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The data packet receiver 1125 is capable of, configured to, or operable to support a means for receiving, at a modem of the UE via a first wireless channel, one or more data packets, where the one or more data packets include respective ECN fields in respective header portions of the one or more data packets. The congestion information forwarding component 1130 is capable of, configured to, or operable to support a means for sending, from the modem of the UE to a congestion controller of the UE, congestion information associated with the one or more data packets received via the first wireless channel. The feedback message transmitter 1135 is capable of, configured to, or operable to support a means for transmitting a feedback message associated with the one or more data packets, the feedback message being based on the congestion information received at the congestion controller of the UE from the modem of the UE.

Figure 12:
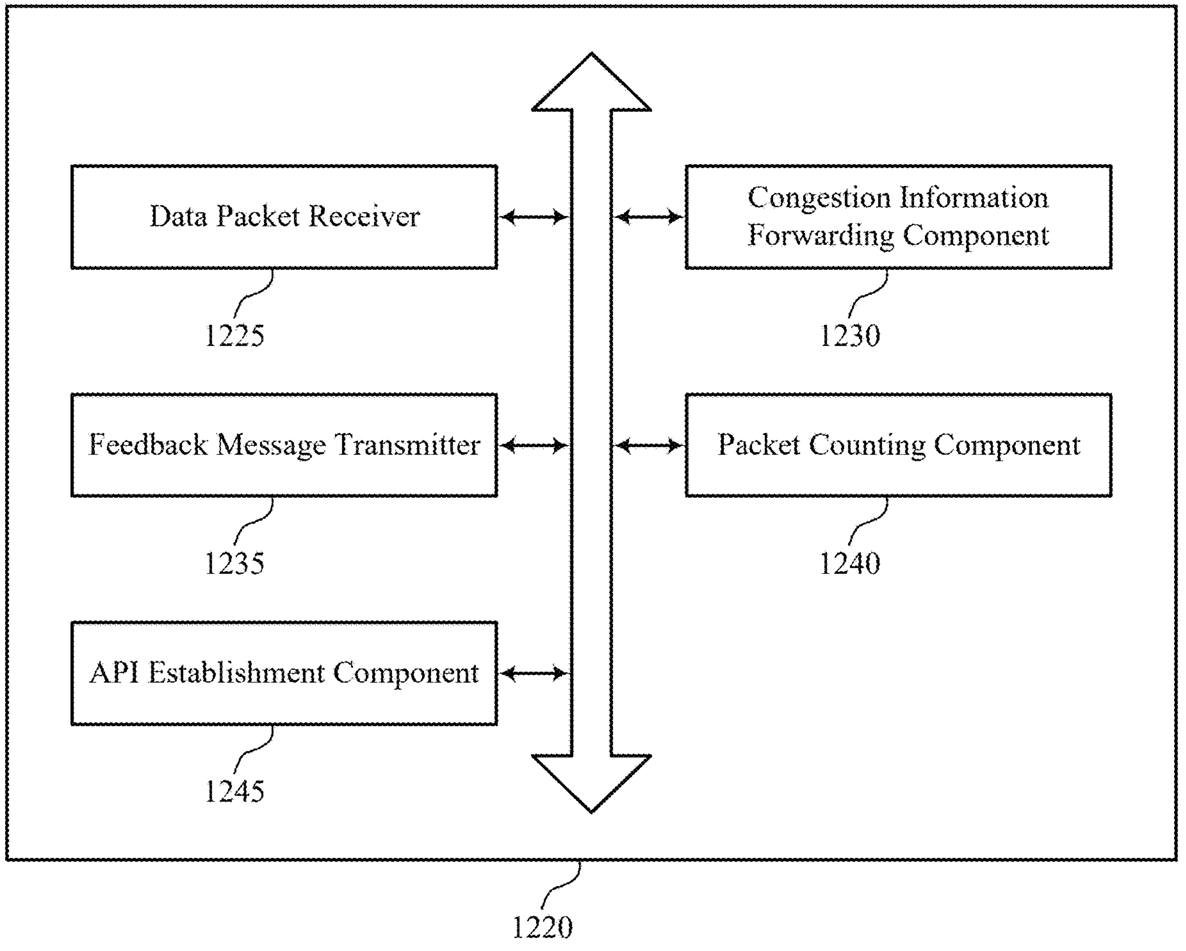
FIG. 12 shows a block diagram of a communications manager that supports device assisted congestion control in accordance with one or more aspects of the present disclosure.

FIG. 12 shows a block diagram 1200 of a communications manager 1220 that supports device assisted congestion control in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of device assisted congestion control as described herein. For example, the communications manager 1220 may include a data packet receiver 1225, a congestion information forwarding component 1230, a feedback message transmitter 1235, a packet counting component 1240, an API establishment component 1245, or any combination thereof. Each of these components, or components or subcomponents thereof (e.g., one or more processors, one or more memories), may communicate, directly or indirectly, with one another (e.g., via one or more buses).

The communications manager 1220 may support wireless communications in accordance with examples as disclosed herein. The data packet receiver 1225 is capable of, configured to, or operable to support a means for receiving, at a modem of the UE via a first wireless channel, one or more data packets, where the one or more data packets include respective ECN fields in respective header portions of the one or more data packets. The congestion information forwarding component 1230 is capable of, configured to, or operable to support a means for sending, from the modem of the UE to a congestion controller of the UE, congestion information associated with the one or more data packets received via the first wireless channel. The feedback message transmitter 1235 is capable of, configured to, or operable to support a means for transmitting a feedback message associated with the one or more data packets, the feedback message being based on the congestion information received at the congestion controller of the UE from the modem of the UE.

In some examples, the packet counting component 1240 is capable of, configured to, or operable to support a means for performing, at the congestion controller of the UE, a packet counting procedure to detect a first quantity of data packets of the one or more data packets that include a marked ECN field and a second quantity of data packets from the one or more data packets that include an unmarked ECN field, where the first quantity of data packets, the second quantity of data packets, or both are modified based on the congestion information. In some examples, the feedback message transmitter 1235 is capable of, configured to, or operable to support a means for transmitting, via the feedback message, an ECN field marking report including the first quantity of data packets and the second quantity of data packets based on performing the packet counting procedure.

In some examples, the API establishment component 1245 is capable of, configured to, or operable to support a means for establishing an API between with the modem of the UE and the congestion controller, where the UE sends the congestion information from the modem of the UE to the congestion controller of the UE via the API.

In some examples, to support transmitting the feedback message, the feedback message transmitter 1235 is capable of, configured to, or operable to support a means for transmitting, via the feedback message, an indication of a target bitrate for subsequent communications, the target bitrate being based on the congestion information.

In some examples, to support transmitting the feedback message, the feedback message transmitter 1235 is capable of, configured to, or operable to support a means for transmitting, via the feedback message, an indication of a target congestion window for subsequent communications, the target congestion window being based on the congestion information, where the target congestion window is transmitted based on a type of transport protocol used by the UE.

In some examples, to support transmitting the feedback message, the feedback message transmitter 1235 is capable of, configured to, or operable to support a means for transmitting, via the feedback message, both an ECN field marking report and the congestion information associated with the one or more data packets, the ECN field marking report indicating a first quantity of data packets of the one or more data packets that include a marked ECN field and a second quantity of data packets from the one or more data packets that include an unmarked ECN field.

In some examples, to support transmitting the congestion information via the feedback message, the feedback message transmitter 1235 is capable of, configured to, or operable to support a means for transmitting the congestion information within an options field of a header of the feedback message based on a type of transport protocol being used by the UE.

In some examples, the congestion information includes an indication of a transfer time associated with the one or more data packets, an indication of a HARQ pattern, one or more link capacity measurements associated with the first wireless channel, one or more SNR measurements associated with the first wireless channel, or any combination thereof.

Figure 13:
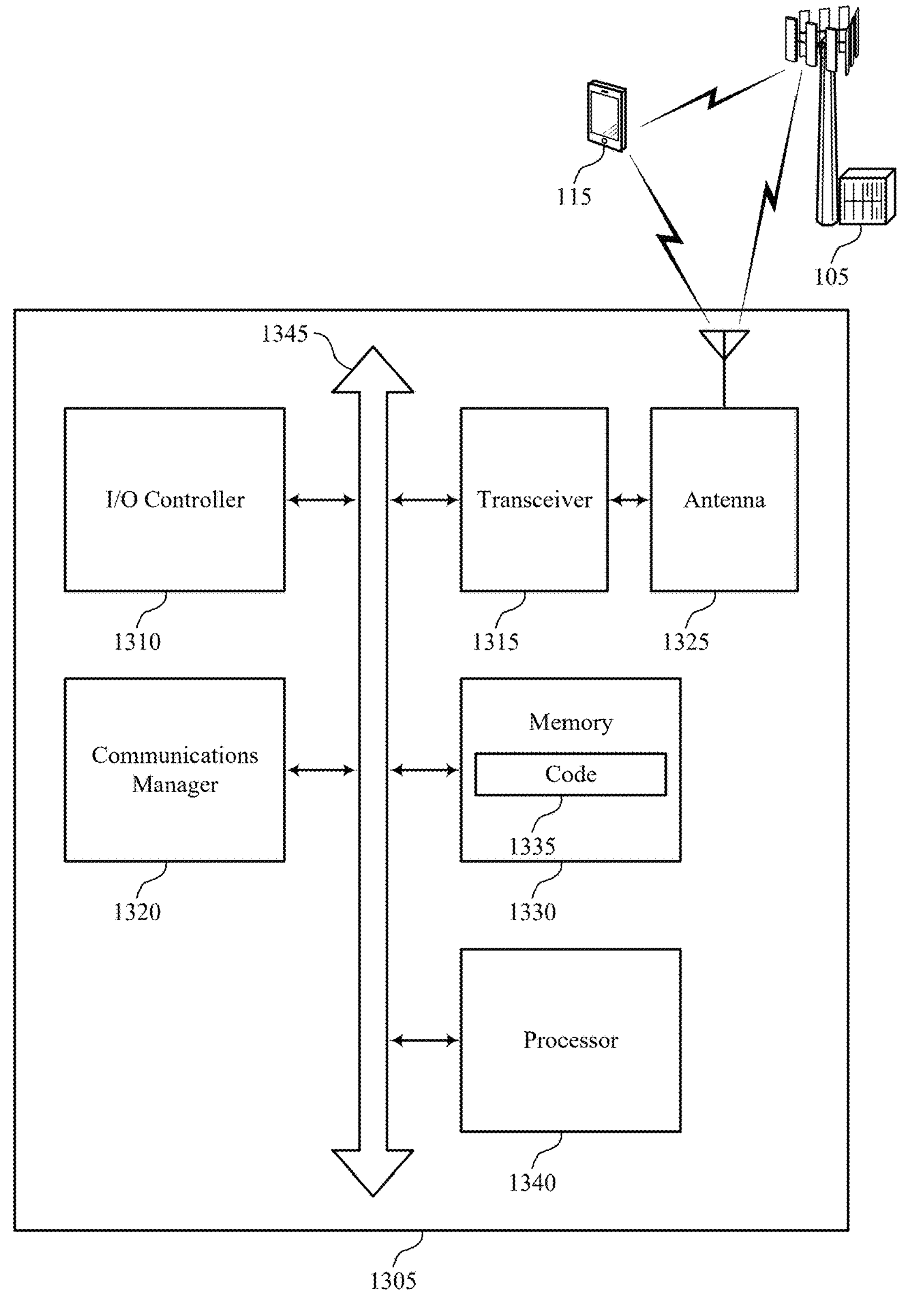
FIG. 13 shows a diagram of a system including a device that supports device assisted congestion control in accordance with one or more aspects of the present disclosure.

FIG. 13 shows a diagram of a system 1300 including a device 1305 that supports device assisted congestion control in accordance with one or more aspects of the present disclosure. The device 1305 may be an example of or include components of a device 1005, a device 1105, or a UE 115 as described herein. The device 1305 may include components for bi-directional voice and data communications including components for transmitting and receiving communications, such as a communications manager 1320, an I/O controller, such as an I/O controller 1310, a transceiver 1315, one or more antennas 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna. However, in some other cases, the device 1305 may have more than one antenna, which may be capable of concurrently transmitting or receiving multiple wireless transmissions. The transceiver 1315 may communicate bi-directionally via the one or more antennas 1325 using wired or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include RAM and ROM. The at least one memory 1330 may store computer-readable, computer-executable, or processor-executable code, such as the code 1335. The code 1335 may include instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may include, among other things, a BIOS which may control basic hardware or software operation such as the interaction with peripheral components or devices.

The at least one processor 1340 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting device assisted congestion control). For example, the device 1305 or a component of the device 1305 may include at least one processor 1340 and at least one memory 1330 coupled with or to the at least one processor 1340, the at least one processor 1340 and the at least one memory 1330 configured to perform various functions described herein.

In some examples, the at least one processor 1340 may include multiple processors and the at least one memory 1330 may include multiple memories. One or more of the multiple processors may be coupled with one or more of the multiple memories, which may, individually or collectively, be configured to perform various functions described herein. In some examples, the at least one processor 1340 may be a component of a processing system, which may refer to a system (such as a series) of machines, circuitry (including, for example, one or both of processor circuitry (which may include the at least one processor 1340) and memory circuitry (which may include the at least one memory 1330)), or components, that receives or obtains inputs and processes the inputs to produce, generate, or obtain a set of outputs. The processing system may be configured to perform one or more of the functions described herein. For example, the at least one processor 1340 or a processing system including the at least one processor 1340 may be configured to, configurable to, or operable to cause the device 1305 to perform one or more of the functions described herein. Further, as described herein, being "configured to," being "configurable to," and being "operable to" may be used interchangeably and may be associated with a capability, when executing code 1335 (e.g., processor-executable code) stored in the at least one memory 1330 or otherwise, to perform one or more of the functions described herein.

The communications manager 1320 may support wireless communications in accordance with examples as disclosed herein. For example, the communications manager 1320 is capable of, configured to, or operable to support a means for receiving, at a modem of the UE via a first wireless channel, one or more data packets, where the one or more data packets include respective ECN fields in respective header portions of the one or more data packets. The communications manager 1320 is capable of, configured to, or operable to support a means for sending, from the modem of the UE to a congestion controller of the UE, congestion information associated with the one or more data packets received via the first wireless channel. The communications manager 1320 is capable of, configured to, or operable to support a means for transmitting a feedback message associated with the one or more data packets, the feedback message being based on the congestion information received at the congestion controller of the UE from the modem of the UE.

By including or configuring the communications manager 1320 in accordance with examples as described herein, the device 1305 may support techniques for improving rate adaptations for subsequent communications by utilizing congestion information obtained at the modem of a UE 115 to support improved communication reliability, reduced latency, improved user experience related to reduced processing, reduced power consumption, more efficient utilization of communication resources, improved coordination between devices, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of device assisted congestion control as described herein, or the at least one processor 1340 and the at least one memory 1330 may be otherwise configured to, individually or collectively, perform or support such operations.

Figure 14:
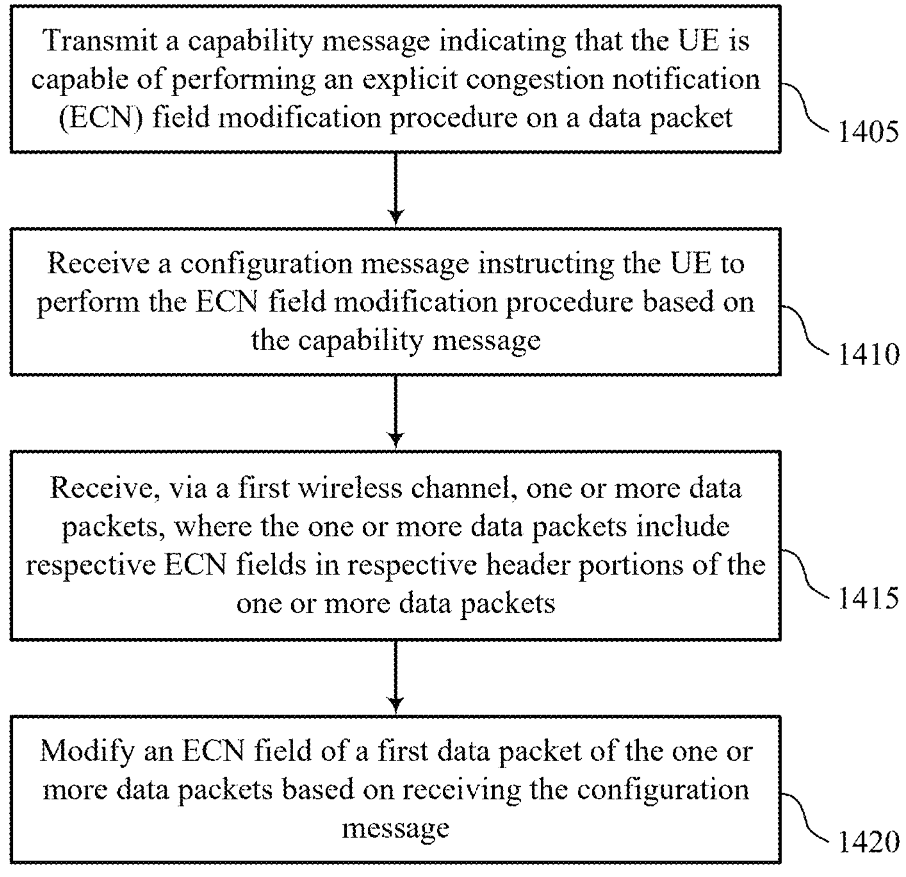
FIGS. 14 and 15 show flowcharts illustrating methods that support device assisted congestion control in accordance with one or more aspects of the present disclosure.

FIG. 14 shows a flowchart illustrating a method 1400 that supports device assisted congestion control in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting a capability message indicating that the UE is capable of performing an ECN field modification procedure on a data packet. The operations of 1405 may be performed in accordance with examples as disclosed herein. In some examples, aspects of the operations of 1405 may be performed by a capability message transmitter 825 as described with reference to FIG. 8.

At 1410, the method may include receiving a configuration message instructing the UE to perform the ECN field modification procedure based on the capability message. The operations of 1410 may be performed in accordance with examples as disclosed herein. In some examples, aspects of the operations of 1410 may be performed by a configuration receiver 830 as described with reference to FIG. 8.

At 1415, the method may include receiving, via a first wireless channel, one or more data packets, where the one or more data packets include respective ECN fields in respective header portions of the one or more data packets. The operations of 1415 may be performed in accordance with examples as disclosed herein. In some examples, aspects of the operations of 1415 may be performed by a data packet receiver 835 as described with reference to FIG. 8.

At 1420, the method may include modifying an ECN field of a first data packet of the one or more data packets based on receiving the configuration message. The operations of 1420 may be performed in accordance with examples as disclosed herein. In some examples, aspects of the operations of 1420 may be performed by a ECN field modification component 840 as described with reference to FIG. 8.

Figure 15:
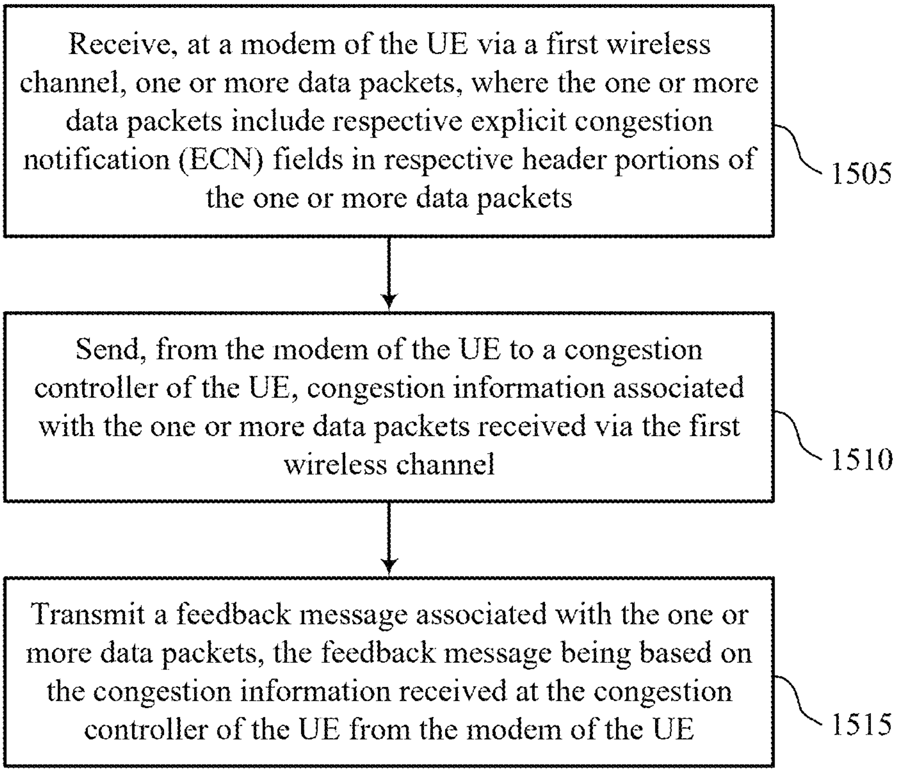

FIG. 15 shows a flowchart illustrating a method 1500 that supports device assisted congestion control in accordance with one or more aspects of the present disclosure. The operations of the method 1500 may be implemented by a UE 115 or its components as described herein. For example, the operations of the method 1500 may be performed by a UE 115 as described with reference to FIGS. 1 through 5 and 10 through 13. In some examples, a UE 115 may execute a set of instructions to control the functional elements of the UE 115 to perform the described functions. Additionally, or alternatively, the UE 115 may perform aspects of the described functions using special-purpose hardware.

At 1505, the method may include receiving, at a modem of the UE via a first wireless channel, one or more data packets, where the one or more data packets include respective ECN fields in respective header portions of the one or more data packets. The operations of 1505 may be performed in accordance with examples as disclosed herein. In some examples, aspects of the operations of 1505 may be performed by a data packet receiver 1225 as described with reference to FIG. 12.

At 1510, the method may include sending, from the modem of the UE to a congestion controller of the UE, congestion information associated with the one or more data packets received via the first wireless channel. The operations of 1510 may be performed in accordance with examples as disclosed herein. In some examples, aspects of the operations of 1510 may be performed by a congestion information forwarding component 1230 as described with reference to FIG. 12.

At 1515, the method may include transmitting a feedback message associated with the one or more data packets, the feedback message being based on the congestion information received at the congestion controller of the UE from the modem of the UE. The operations of 1515 may be performed in accordance with examples as disclosed herein. In some examples, aspects of the operations of 1515 may be performed by a feedback message transmitter 1235 as described with reference to FIG. 12.

The following provides an overview of aspects of the present disclosure:

Aspect 1: A method for wireless communications by a UE, comprising: transmitting a capability message indicating that the UE is capable of performing an ECN field modification procedure on a data packet; receiving a configuration message instructing the UE to perform the ECN field modification procedure based at least in part on the capability message; receiving, via a first wireless channel, one or more data packets, wherein the one or more data packets comprise respective ECN fields in respective header portions of the one or more data packets; and modifying an ECN field of a first data packet of the one or more data packets based at least in part on receiving the configuration message.

Aspect 2: The method of aspect 1, further comprising: transmitting, based at least in part on receiving the one or more data packets, a feedback message comprising an ECN marking report, the ECN marking report indicating a first quantity of data packets of the one or more data packets that comprise a marked ECN field and indicating a second quantity of data packets from the one or more data packets that comprise an unmarked ECN field.

Aspect 3: The method of aspect 2, wherein the first quantity of data packets and the second quantity of data packets indicated via the ECN marking report are based at least in part on the ECN field of the first data packet being modified via the ECN field modification procedure.

Aspect 4: The method of any of aspects 1 through 3, wherein modifying the ECN field of the first data packet comprises: modifying the ECN field of the first data packet to add a marking of congestion to the ECN field.

Aspect 5: The method of any of aspects 1 through 4, wherein modifying the ECN field of the first data packet comprises: modifying the ECN field of the first data packet to remove a marking of congestion to the ECN field.

Aspect 6: The method of any of aspects 1 through 5, further comprising: sending the one or more data packets from a modem of the UE to a congestion controller of the UE, wherein the ECN field of the first data packet is modified at the modem of the UE.

Aspect 7: The method of any of aspects 1 through 6, wherein the ECN field of the first data packet is modified via the ECN field modification procedure based at least in part on congestion information associated with the first wireless channel.

Aspect 8: The method of aspect 7, wherein the congestion information comprises an indication of a throughput level, an indication of a transfer time associated with the one or more data packets, an indication of a HARQ pattern, one or more link capacity measurements associated with the first wireless channel, one or more SNR measurements associated with the first wireless channel, or any combination thereof.

Aspect 9: A method for wireless communications by a UE, comprising: receiving, at a modem of the UE via a first wireless channel, one or more data packets, wherein the one or more data packets comprise respective ECN fields in respective header portions of the one or more data packets; sending, from the modem of the UE to a congestion controller of the UE, congestion information associated with the one or more data packets received via the first wireless channel; and transmitting a feedback message associated with the one or more data packets, the feedback message being based at least in part on the congestion information received at the congestion controller of the UE from the modem of the UE.

Aspect 10: The method of aspect 9, further comprising: performing, at the congestion controller of the UE, a packet counting procedure to detect a first quantity of data packets of the one or more data packets that comprise a marked ECN field and a second quantity of data packets from the one or more data packets that comprise an unmarked ECN field, wherein the first quantity of data packets, the second quantity of data packets, or both are modified based at least in part on the congestion information; and transmitting, via the feedback message, am ECN field marking report comprising the first quantity of data packets and the second quantity of data packets based at least in part on performing the packet counting procedure.

Aspect 11: The method of any of aspects 9 through 10, further comprising: establishing an API between with the modem of the UE and the congestion controller, wherein the UE sends the congestion information from the modem of the UE to the congestion controller of the UE via the API.

Aspect 12: The method of any of aspects 9 through 11, wherein transmitting the feedback message comprises: transmitting, via the feedback message, an indication of a target bitrate for subsequent communications, the target bitrate being based at least in part on the congestion information.

Aspect 13: The method of any of aspects 9 through 12, wherein transmitting the feedback message comprises: transmitting, via the feedback message, an indication of a target congestion window for subsequent communications, the target congestion window being based at least in part on the congestion information, wherein the target congestion window is transmitted based at least in part on a type of transport protocol used by the UE.

Aspect 14: The method of any of aspects 9 through 13, wherein transmitting the feedback message comprises: transmitting, via the feedback message, both an ECN field marking report and the congestion information associated with the one or more data packets, the ECN field marking report indicating a first quantity of data packets of the one or more data packets that comprise a marked ECN field and a second quantity of data packets from the one or more data packets that comprise an unmarked ECN field.

Aspect 15: The method of aspect 14, wherein transmitting the congestion information via the feedback message comprises: transmitting the congestion information within an options field of a header of the feedback message based at least in part on a type of transport protocol being used by the UE.

Aspect 16: The method of any of aspects 9 through 15, wherein the congestion information comprises an indication of a transfer time associated with the one or more data packets, an indication of a HARQ pattern, one or more link capacity measurements associated with the first wireless channel, one or more SNR measurements associated with the first wireless channel, or any combination thereof.

Aspect 17: A UE for wireless communications, comprising one or more memories storing processor-executable code, and one or more processors coupled with the one or more memories and individually or collectively operable to execute the code to cause the UE to perform a method of any of aspects 1 through 8.

Aspect 18: A UE for wireless communications, comprising at least one means for performing a method of any of aspects 1 through 8.

Aspect 19: A non-transitory computer-readable medium storing code for wireless communications, the code comprising instructions executable by one or more processors to perform a method of any of aspects 1 through 8.

Aspect 20: A UE for wireless communications, comprising one or more memories storing processor-executable code, and one or more processors coupled with the one or more memories and individually or collectively operable to execute the code to cause the UE to perform a method of any of aspects 9 through 16.

Aspect 21: A UE for wireless communications, comprising at least one means for performing a method of any of aspects 9 through 16.

Aspect 22: A non-transitory computer-readable medium storing code for wireless communications, the code comprising instructions executable by one or more processors to perform a method of any of aspects 9 through 16.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers.

Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit a capability message indicating that the UE is capable of performing an explicit congestion notification (ECN) field modification procedure on a data packet;

receive a configuration message instructing the UE to perform the ECN field modification procedure based at least in part on the capability message;

receive, via a first wireless channel, one or more data packets, wherein the one or more data packets comprise respective ECN fields in respective header portions of the one or more data packets; and modify an ECN field of a first data packet of the one or more data packets based at least in part on receiving the configuration message.

2. The UE of claim 1, wherein the one or more processors are individually or collectively further operable to execute the code to cause the UE to:

transmit, based at least in part on receiving the one or more data packets, a feedback message comprising an ECN marking report, the ECN marking report indicating a first quantity of data packets of the one or more data packets that comprise a marked ECN field and indicating a second quantity of data packets from the one or more data packets that comprise an unmarked ECN field, wherein the first quantity of data packets and the second quantity of data packets indicated via the ECN marking report are based at least in part on the ECN field of the first data packet being modified via the ECN field modification procedure.

3. The UE of claim 1, wherein, to modify the ECN field of the first data packet, the one or more processors are individually or collectively operable to execute the code to cause the UE to:

modify the ECN field of the first data packet to add a marking of congestion to the ECN field.

4. The UE of claim 1, wherein, to modify the ECN field of the first data packet, the one or more processors are individually or collectively operable to execute the code to cause the UE to:

modify the ECN field of the first data packet to remove a marking of congestion to the ECN field.

5. The UE of claim 1, wherein the one or more processors are individually or collectively further operable to execute the code to cause the UE to:

send the one or more data packets from a modem of the UE to a congestion controller of the UE, wherein the ECN field of the first data packet is modified at the modem of the UE.

6. The UE of claim 1, wherein the ECN field of the first data packet is modified via the ECN field modification procedure based at least in part on congestion information associated with the first wireless channel.

7. The UE of claim 6, wherein the congestion information comprises an indication of a throughput level, an indication of a transfer time associated with the one or more data packets, an indication of a hybrid automatic repeat request pattern, one or more link capacity measurements associated with the first wireless channel, one or more signal to noise ratio measurements associated with the first wireless channel, or any combination thereof.

8. A user equipment (UE), comprising:

one or more memories storing processor-executable code; and one or more processors coupled with the one or more memories and individually or collectively operable to execute the code to cause the UE to:

receive, at a modem of the UE via a first wireless channel, one or more data packets, wherein the one or more data packets comprise respective explicit congestion notification (ECN) fields in respective header portions of the one or more data packets;

send, from the modem of the UE to a congestion controller of the UE, congestion information associated with the one or more data packets received via the first wireless channel; and transmit a feedback message associated with the one or more data packets, the feedback message being based at least in part on the congestion information received at the congestion controller of the UE from the modem of the UE.

9. The UE of claim 8, wherein the one or more processors are individually or collectively further operable to execute the code to cause the UE to:

perform, at the congestion controller of the UE, a packet counting procedure to detect a first quantity of data packets of the one or more data packets that comprise a marked ECN field and a second quantity of data packets from the one or more data packets that comprise an unmarked ECN field, wherein the first quantity of data packets, the second quantity of data packets, or both are modified based at least in part on the congestion information; and transmit, via the feedback message, an ECN field marking report comprising the first quantity of data packets and the second quantity of data packets based at least in part on performing the packet counting procedure.

10. The UE of claim 8, wherein the one or more processors are individually or collectively further operable to execute the code to cause the UE to:

establish an application programming interface (API) between with the modem of the UE and the congestion controller, wherein the UE sends the congestion information from the modem of the UE to the congestion controller of the UE via the API.

11. The UE of claim 8, wherein, to transmit the feedback message, the one or more processors are individually or collectively operable to execute the code to cause the UE to:

transmit, via the feedback message, an indication of a target bitrate for subsequent communications, the target bitrate being based at least in part on the congestion information.

12. The UE of claim 8, wherein, to transmit the feedback message, the one or more processors are individually or collectively operable to execute the code to cause the UE to:

transmit, via the feedback message, an indication of a target congestion window for subsequent communications, the target congestion window being based at least in part on the congestion information, wherein the target congestion window is transmitted based at least in part on a type of transport protocol used by the UE.

13. The UE of claim 8, wherein, to transmit the feedback message, the one or more processors are individually or collectively operable to execute the code to cause the UE to:

transmit, via the feedback message, both an ECN field marking report and the congestion information associated with the one or more data packets, the ECN field marking report indicating a first quantity of data packets of the one or more data packets that comprise a marked ECN field and a second quantity of data packets from the one or more data packets that comprise an unmarked ECN field.

14. The UE of claim 13, wherein, to transmit the congestion information via the feedback message, the one or more processors are individually or collectively operable to execute the code to cause the UE to:

transmit the congestion information within an options field of a header of the feedback message based at least in part on a type of transport protocol being used by the UE.

15. The UE of claim 8, wherein the congestion information comprises an indication of a transfer time associated with the one or more data packets, an indication of a hybrid automatic repeat request pattern, one or more link capacity measurements associated with the first wireless channel, one or more signal to noise ratio measurements associated with the first wireless channel, or any combination thereof.

16. A method for wireless communications by a user equipment (UE), comprising:

receiving, at a modem of the UE via a first wireless channel, one or more data packets, wherein the one or more data packets comprise respective explicit congestion notification (ECN) fields in respective header portions of the one or more data packets;

sending, from the modem of the UE to a congestion controller of the UE, congestion information associated with the one or more data packets received via the first wireless channel; and transmitting a feedback message associated with the one or more data packets, the feedback message being based at least in part on the congestion information received at the congestion controller of the UE from the modem of the UE.

17. The method of claim 16, further comprising:

performing, at the congestion controller of the UE, a packet counting procedure to detect a first quantity of data packets of the one or more data packets that comprise a marked ECN field and a second quantity of data packets from the one or more data packets that comprise an unmarked ECN field, wherein the first quantity of data packets, the second quantity of data packets, or both are modified based at least in part on the congestion information; and transmitting, via the feedback message, an ECN field marking report comprising the first quantity of data packets and the second quantity of data packets based at least in part on performing the packet counting procedure.

18. The method of claim 16, wherein transmitting the feedback message comprises:

transmitting, via the feedback message, an indication of a target bitrate for subsequent communications, the target bitrate being based at least in part on the congestion information.

19. The method of claim 16, wherein transmitting the feedback message comprises:

transmitting, via the feedback message, both an ECN field marking report and the congestion information associated with the one or more data packets, the ECN field marking report indicating a first quantity of data packets of the one or more data packets that comprise a marked ECN field and a second quantity of data packets from the one or more data packets that comprise an unmarked ECN field.

20. The method of claim 16, wherein the congestion information comprises an indication of a transfer time associated with the one or more data packets, an indication of a hybrid automatic repeat request pattern, one or more link capacity measurements associated with the first wireless channel, one or more signal to noise ratio measurements associated with the first wireless channel, or any combination thereof.

* * * * *